US012589951B2

(12) United States Patent
  Lei et al.

(10) Patent No.: US 12,589,951 B2
(45) Date of Patent: Mar. 31, 2026

(54) ROBOTIC SYSTEMS WITH GRIPPING MECHANISMS, AND RELATED SYSTEMS AND METHODS

(71) Applicant: MUJIN, Inc., Tokyo (JP)

(72) Inventors: Lei Lei, Guangzhou (CN); Yixuan Zhang, Guangzhou (CN); Xutao Ye, Guangzhou (CN); Yi Xu, Guangzhou (CN); Brandon Coats, Jeffersonville, IN (US); Rosen Nikolaev Diankov, Tokyo (JP); Zhili Lai, Guangzhou (CN); Guohao Huang, Guangzhou (CN)

(73) Assignee: MUJIN, Inc., Tokyo (JP)

( * ) Notice: Subject to any disclaimer, the term of this patent is extended or adjusted under 35 U.S.C. 154(b) by 760 days.

(21) Appl. No.: 17/885,366

(22) Filed: Aug. 10, 2022

(65) Prior Publication Data
  US 2023/0052763 A1    Feb. 16, 2023

Related U.S. Application Data

(60) Provisional application No. 63/232,663, filed on Aug. 13, 2021.

(51) Int. Cl.
  *B65G 47/91* (2006.01)
(52) U.S. Cl.
  CPC .................................. *B65G 47/91* (2013.01)
(58) Field of Classification Search
  CPC ...... B25J 15/0616; B25J 9/1664; B25J 15/04; B25J 19/023; B25J 9/1612; B25J 9/1653; B25J 9/1687; B25J 13/08; B25J 15/0052; B25J 19/021; B25J 19/022; B25J 19/04; B25J 9/1669; B25J 9/1697; B25J 15/0061; B25J 13/082; B25J 13/085; B25J 15/0028; B25J 15/0206; B25J 15/0253; B25J 15/0683; B25J 9/101; B25J 9/1661; B25J 9/1666; G05B 2219/39558; G05B 2219/39553; G05B 2219/40006;

(Continued)

(56) References Cited

U.S. PATENT DOCUMENTS

2019/0084762 A1 *  3/2019  Fujihara .............. B25J 15/0061
2023/0356410 A1 *  11/2023  Ouchi .................. B25J 15/0253

FOREIGN PATENT DOCUMENTS

JP        2016209944 A  * 12/2016  ............. B25J 18/02
JP        2020044603 A  * 3/2020

* cited by examiner

*Primary Examiner* — Wade Miles
*Assistant Examiner* — Jerrod Irvin Davis
(74) *Attorney, Agent, or Firm* — Dorsey & Whitney LLP

(57) ABSTRACT

Robotic systems with variable gripping mechanisms, and related systems and methods are disclosed herein. In some embodiments, the robotic system includes a robotic arm and an object-gripping assembly coupled to the robotic arm. The object-gripping assembly can include a main body coupled to the robotic arm through an external connector on an upper surface of the main body and a vacuum operated gripping component coupled to a lower surface of the main body. The object-gripping assembly can also include a variable-width gripping component coupled to the main body. The variable-width gripping component is movable between a fully folded state, a plurality of extended states, and a clamping state to grip a variety of target objects of varying shapes, sizes, weights, and orientations.

19 Claims, 17 Drawing Sheets

(58) Field of Classification Search
CPC ........... G05B 2219/40604; G05B 2219/39024;
G05B 2219/39557; B65G 2203/0233;
B65G 2203/0283; B65G 2203/0291;
B65G 2203/041; B65G 47/91; B65G
47/917; B65G 47/918; B65G 61/00;
B65G 67/24; B65G 67/08; G06Q 10/08
See application file for complete search history.

700

Detect Object
702

Plan Pick-Up Operation
704

Configure Gripper
706

Pick Up Detected Object
708

Transport Object
710

Place Object
712

Reset Gripper
714

ROBOTIC SYSTEMS WITH GRIPPING MECHANISMS, AND RELATED SYSTEMS AND METHODS

CROSS-REFERENCE TO RELATED APPLICATION(S)

The present application claims the benefit of U.S. Provisional Patent Application No. 63/232,663, filed Aug. 13, 2021, the entirety of which is incorporated herein by reference.

TECHNICAL FIELD

The present technology related generally to robotic systems with gripping mechanisms, and more specifically robotic systems with features for identifying a target object and adjusting the gripper mechanisms based on the target object.

BACKGROUND

With their ever-increasing performance and lowering cost, many robots (e.g., machines configured to automatically/autonomously execute physical actions) are now extensively used in many fields. Robots, for example, can be used to execute various tasks (e.g., manipulate or transfer an object through space) in manufacturing and/or assembly, packing and/or packaging, transport and/or shipping, etc. In executing the tasks, the robots can replicate human actions, thereby replacing or reducing human involvements that are otherwise required to perform dangerous or repetitive tasks.

However, despite the technological advancements, robots often lack the sophistication necessary to duplicate human interactions required for executing larger and/or more complex tasks. Accordingly, there remains a need for improved techniques and systems for managing operations of and/or interactions between robots.

Figure 1:
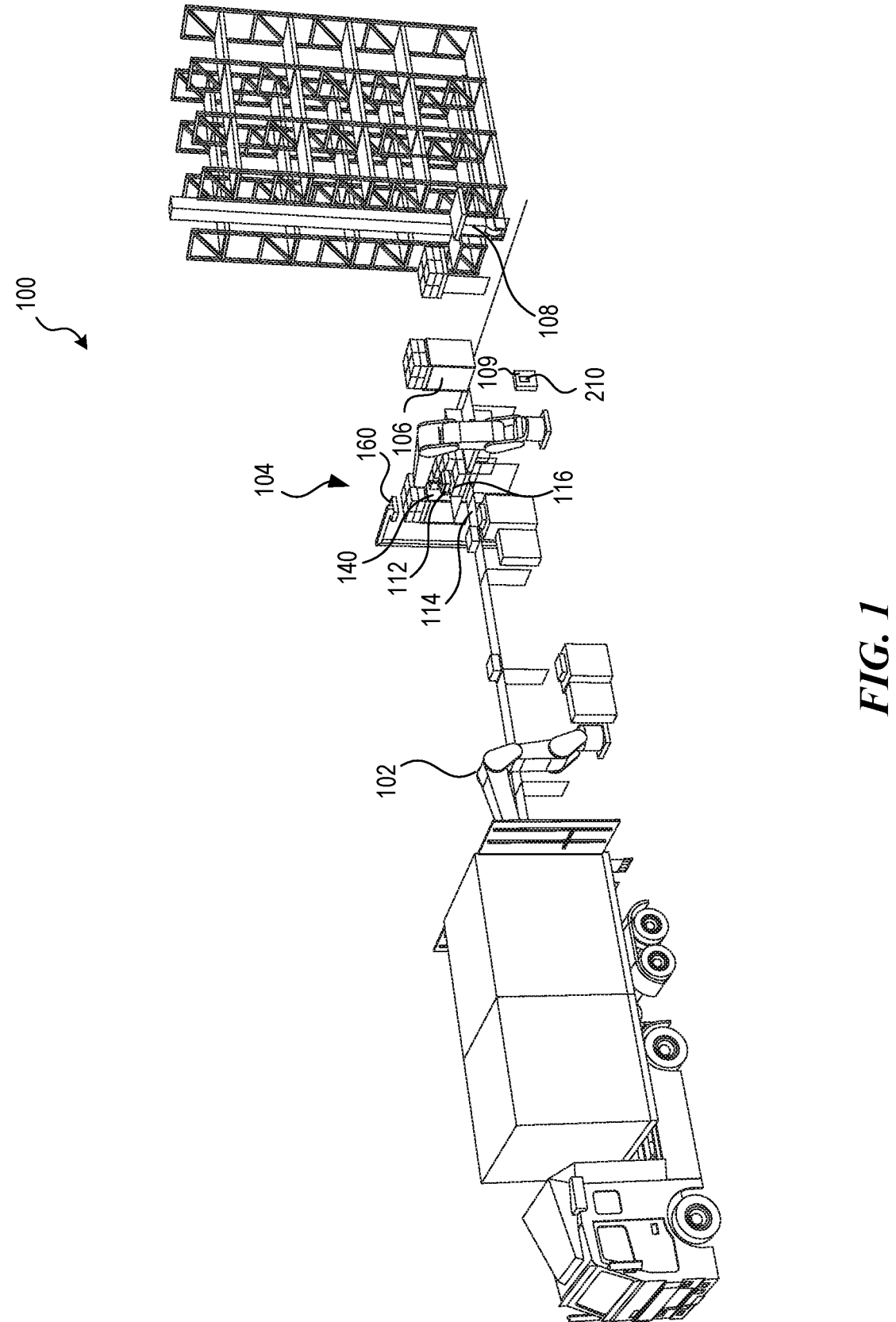
FIG. 1 is an illustration of an example environment in which a robotic system with a gripping mechanism can operate in accordance with some embodiments of the present technology.

The drawings have not necessarily been drawn to scale. Similarly, some components and/or operations can be separated into different blocks or combined into a single block for the purpose of discussion of some of the implementations of the present technology. Moreover, while the technology is amenable to various modifications and alternative forms, specific implementations have been shown by way of example in the drawings and are described in detail below. The intention, however, is not to limit the technology to the particular implementations described.

For ease of reference, the end effector and the components thereof are sometimes described herein with reference to top and bottom, upper and lower, upwards and downwards, a longitudinal plane, a horizontal plane, an x-y plane, a vertical plane, and/or a z-plane relative to the spatial orientation of the embodiments shown in the figures. It is to be understood, however, that the end effector and the components thereof can be moved to, and used in, different spatial orientations without changing the structure and/or function of the disclosed embodiments of the present technology.

DETAILED DESCRIPTION

Overview

Robotic systems with variable gripping mechanisms, and related systems and methods are disclosed herein. In some embodiments, the robotic system includes a robotic arm and an object-gripping assembly (e.g., a multi-purpose end-effector) coupled to the robotic arm. The object-gripping assembly can be configurable to selectively grip different types of objects, such as a pallets; packages, boxes, and/or other suitable objects for placement on the pallet; and a slip sheet for placement above the pallet and/or objects. The object-gripping assembly can include a main body coupled to the robotic arm through an external connector on an upper surface of the main body and a vacuum operated gripping component (e.g., a package gripping portion) coupled to a lower surface of the main body. The object-gripping assembly can also include a variable-width gripping component (e.g., a pallet gripping portion, a slip sheet gripping portion, or a combination thereof) coupled to the main body. The variable-width gripping component is movable between a fully folded state, a plurality of extended states, and a clamping state to allow the object-gripping assembly to engage and lift a variety of target objects of varying shapes, sizes, weights, and orientations.

In some embodiments, the variable-width gripping component includes a linear extension mechanism coupled to the main body, two rotational mechanisms coupled to opposite sides of the of the linear extension mechanism, and one or more mechanical grippers coupled to each of the rotational mechanisms. In the fully folded state, the linear extension mechanism is fully retracted and/or contracted to position the rotational components at a minimum distance apart. Further, the rotational mechanisms are in a raised position, directing each of the mechanical grippers coupled to the rotational mechanisms upward from the lower surface of the main body (e.g., vertical and/or partially vertical). When the object-gripping assembly is in the fully folded state, the vacuum operated gripping component is positioned to define a lowermost surface of the object-gripping assembly and/or to engage with and grip target object at the lowermost surface using a suction force.

To enter an extended state, one or more arms in the linear extension mechanism can be extended and/or expanded to position the rotational components farther apart. The extension can be based on one or more predetermined extended states (e.g., planned based on known widths of various target objects), adjusted based on one or more inputs (e.g., from a robotic component, controller, and/or human operator), adjusted based on one or more detected dimensions of a target object, and the like. Purely by way of example, the object-gripping assembly can include an imaging sensor that is coupled to the main body and positioned to collect image data of the target object that can be used by a controller operatively coupled to the imaging sensor, the vacuum operated gripping component, and the variable-width gripping component. The controller can be configured to receive the image data from the imaging sensor; determine which of the fully folded state and the plurality of extended states to use to grip the target object, move the variable-width gripping component into the determined state; and control the vacuum operated gripping component and/or the variable-width gripping component to grip the object. In various embodiments, the determination of which state to use can be based on a category of the target object, an orientation of the target object, candidate gripping locations on the target object, measured dimensions of the target object, and the like.

To enter the clamping state, the rotational components are actioned (e.g., rotated) into a lowered position to direct the mechanical grippers beneath the lower surface of the main body. In the clamping state, the mechanical clamping components can engage with and/or grip the target object. In some embodiments, the variable-width gripping component also includes one or more press cylinders corresponding to each of the mechanical griping components and positioned to press the target object against the mechanical gripping components. Purely by way of example, the mechanical gripping components can engage a lower surface of the target object while the press cylinders press against an upper surface of the target object. As a result, the press cylinders can help stabilize the target object.

In some embodiments, the variable-width gripping component further includes one or more suction components coupled to the rotational components that are configured to engage an upper surface of various target object types that are not engaged by the vacuum operated gripping component and/or the mechanical gripping components. Because the suction components are coupled to the rotational components, they are also movable between the fully folded state, various extended states, and the clamping state.

Several details describing structures or processes that are well-known and often associated with robotic systems and subsystems, but that can unnecessarily obscure some significant aspects of the disclosed techniques, are not set forth in the following description for purposes of clarity. Moreover, although the following disclosure sets forth several embodiments of different aspects of the present technology, several other embodiments can have different configurations or different components than those described in this section. Accordingly, the disclosed techniques can have other embodiments with additional elements or without several of the elements described below.

Many embodiments or aspects of the present disclosure described below can take the form of computer-executable or controller-executable instructions, including routines executed by a programmable computer or controller. Those skilled in the relevant art will appreciate that the disclosed techniques can be practiced on computer or controller systems other than those shown and described below. The techniques described herein can be embodied in a special-purpose computer or data processor that is specifically programmed, configured, or constructed to execute one or more of the computer-executable instructions described below. Accordingly, the terms "computer" and "controller" as generally used herein refer to any data processor and can include Internet appliances and handheld devices, including palm-top computers, wearable computers, cellular or mobile phones, multi-processor systems, processor-based or programmable consumer electronics, network computers, mini computers, and the like. Information handled by these computers and controllers can be presented at any suitable display medium, including a liquid crystal display (LCD). Instructions for executing computer- or controller-executable tasks can be stored in or on any suitable computer-readable medium, including hardware, firmware, or a combination of hardware and firmware. Instructions can be contained in any suitable memory device, including, for example, a flash drive, USB device, and/or other suitable medium.

The terms "coupled" and "connected," along with their derivatives, can be used herein to describe structural relationships between components. It should be understood that these terms are not intended as synonyms for each other. Rather, in particular embodiments, "connected" can be used to indicate that two or more elements are in direct contact with each other. Unless otherwise made apparent in the context, the term "coupled" can be used to indicate that two or more elements are in either direct or indirect (with other intervening elements between them) contact with each other, or that the two or more elements co-operate or interact with each other (e.g., as in a cause-and-effect relationship, such as for signal transmission/reception or for function calls), or both.

Example Environment for Robotic System

FIG. 1 is an illustration of an example environment in which a robotic system 100 with an object handling mechanism can operate. The operating environment for the robotic system 100 can include one or more structures, such as robots or robotic devices, configured to execute one or more tasks. Aspects of the object handling mechanism can be practiced or implemented by the various structures and/or components.

In the example illustrated in FIG. 1, the robotic system 100 can include an unloading unit 102, a transfer unit 104, a transport unit 106, a loading unit 108, or a combination thereof in a warehouse, a distribution center, or a shipping hub. Each of the units in the robotic system 100 can be configured to execute one or more tasks. The tasks can be combined in sequence to perform an operation that achieves a goal, for example, such as to unload objects from a vehicle, such as a truck, trailer, a van, or train car, for storage in a warehouse or to unload objects from storage locations and load them onto a vehicle for shipping. In another example, the task can include moving objects from one location, such as a container, bin, cage, basket, shelf, platform, pallet, or conveyor belt, to another location. Each of the units can be configured to execute a sequence of actions, such as operating one or more components therein, to execute a task.

In some embodiments, the task can include interaction with a target object 112, such as manipulation, moving, reorienting or a combination thereof, of the object. The target object 112 is the object that will be handled by the robotic system 100. More specifically, the target object 112 can be the specific object among many objects that is the target of an operation or task by the robotics system 100. For example, the target object 112 can be the object that the robotic system 100 has selected for or is currently being handled, manipulated, moved, reoriented, or a combination thereof. The target object 112, as examples, can include boxes, cases, tubes, packages, bundles, an assortment of individual items, or any other object that can be handled by the robotic system 100.

As an example, the task can include transferring the target object 112 from an object source 114 to a task location 116. The object source 114 is a receptacle for storage of objects. The object source 114 can include numerous configurations and forms. For example, the object source 114 can be a platform, with or without walls, on which objects can be placed or stacked, such as a pallet, a shelf, or a conveyor belt. As another, the object source 114 can be a partially or fully enclosed receptacle with walls or lid in which objects can be placed, such as a bin, cage, or basket. In some embodiments, the walls of the object source 114 with the partially or fully enclosed can be transparent or can include openings or gaps of various sizes such that portions of the objects contained therein can be visible or partially visible through the walls.

FIG. 1 illustrates examples of the possible functions and operations that can be performed by the various units of the robotic system 100 in handling the target object 112 and it is understood that the environment and conditions can differ from those described hereinafter. For example, the unloading unit 102 can be a vehicle offloading robot configured to transfer the target object 112 from a location in a carrier, such as a truck, to a location on a conveyor belt. Also, the transfer unit 104, such as a palletizing robot, can be configured to transfer the target object 112 from a location on the conveyor belt to a location on the transport unit 106, such as for loading the target object 112 on a pallet on the transport unit 106. In another example, the transfer unit 104 can be a piece-picking robot configured to transfer the target object 112 from one container to another container. In completing the operation, the transport unit 106 can transfer the target object 112 from an area associated with the transfer unit 104 to an area associated with the loading unit 108, and the loading unit 108 can transfer the target object 112, such as by moving the pallet carrying the target object 112, from the transfer unit 104 to a storage location, such as a location on the shelves.

In some embodiments, the robotic system 100 can include a unit (e.g., the transfer unit) configured to perform different tasks that involve different target objects. For example, the robotic system 100 can include the transfer unit 104 that is configured (via, e.g., a multi-purpose end-effector) to manipulate packages, package container (e.g., pallets or bins), and/or support objects (e.g., slip sheets). The transfer unit 104 may be located at a station that has the different target objects arranged around the transfer unit 104. The robotic system 100 can use the multi-purpose configuration to sequence and implement the different tasks to achieve a complex operation. Additionally, or alternatively, the station can be used accommodate or implement different types of tasks (e.g., packing/unpacking objects from a shipping unit, stacking or grouping pallets/slip sheets, and the like) according to real-time requirements or conditions of the overall system 100. Details regarding the tasks and the multi-purpose configuration are described below.

For illustrative purposes, the robotic system 100 is described in the context of a shipping center; however, it is understood that the robotic system 100 can be configured to execute tasks in other environments or for other purposes, such as for manufacturing, assembly, packaging, healthcare, or other types of automation. It is also understood that the robotic system 100 can include other units, such as manipulators, service robots, modular robots, that are not shown in FIG. 1. For example, in some embodiments, the robotic system 100 can include a depalletizing unit for transferring the objects from cages, carts, or pallets onto conveyors or other pallets, a container-switching unit for transferring the objects from one container to another, a packaging unit for wrapping the objects, a sorting unit for grouping objects according to one or more characteristics thereof, a piece-picking unit for manipulating the objects differently, such as sorting, grouping, and/or transferring, according to one or more characteristics thereof, or a combination thereof.

The robotic system 100 can include a controller 109 configured to interface with and/or control one or more of the robotic units. For example, the controller 109 can include circuits (e.g., one or more processors, memory, etc.) configured to derive motion plans and/or corresponding commands, settings, and the like used to operate the corresponding robotic unit. The controller 109 can communicate the motion plans, the commands, settings, etc. to the robotic unit, and the robotic unit can execute the communicated plan to accomplish a corresponding task, such as to transfer the target object 112 from the object source 114 to the task location 116.

Suitable System

Figure 2:
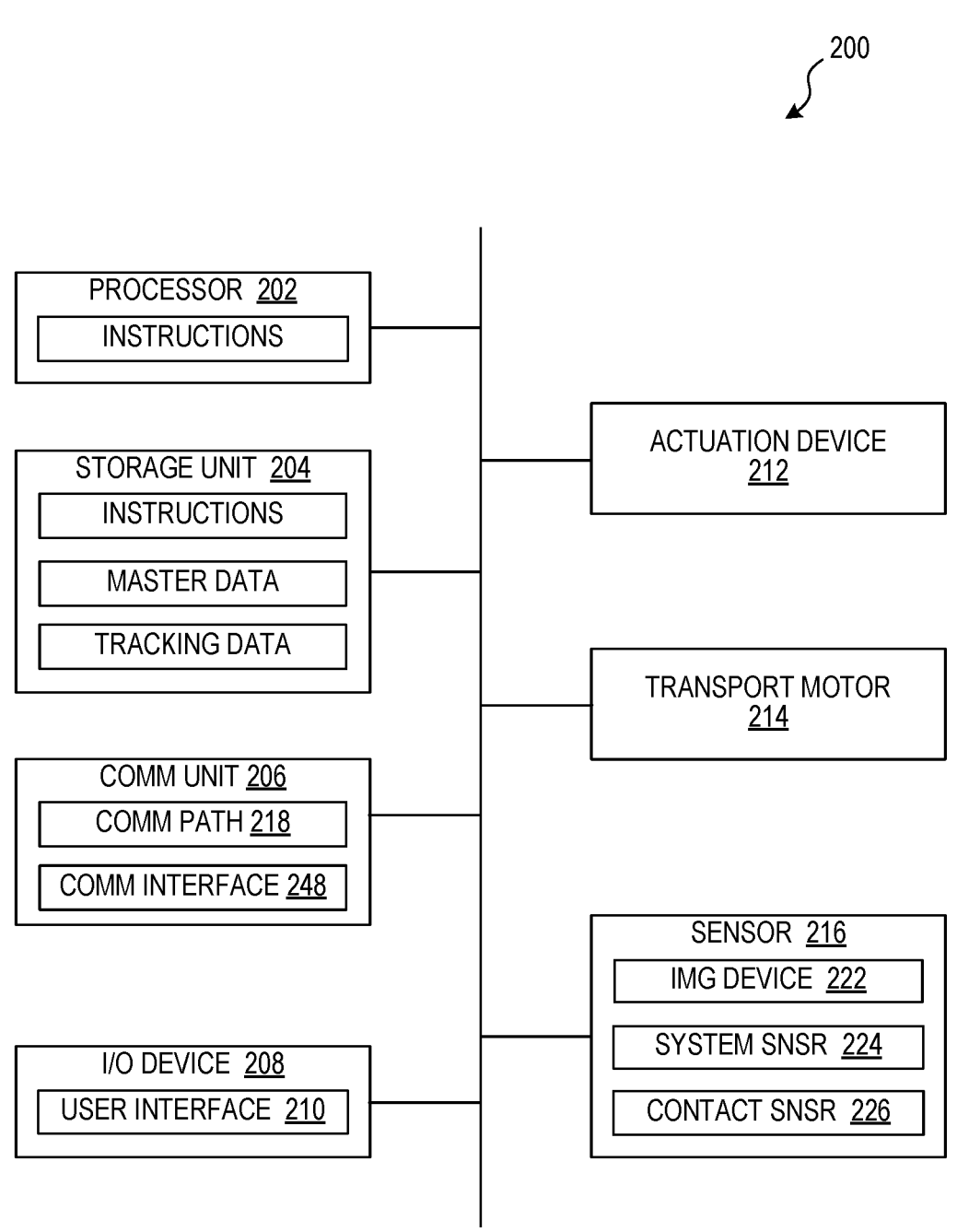
FIG. 2 is a block diagram illustrating the robotic system of FIG. 1 in accordance with some embodiments of the present technology.

FIG. 2 is a block diagram illustrating the robotic system 100 in accordance with one or more embodiments of the present technology. In some embodiments, for example, the robotic system 100 can include electronic devices, electrical devices, or a combination thereof, such as a control unit 202 (sometimes also referred to herein as a "processor"), a storage unit 204, a communication unit 206, a system input/output (I/O) device 208 having a system interface 210 (sometimes also referred to herein as a "user interface 210"), one or more actuation devices 212, one or more transport motors 214, one or more sensor units 216, or a combination thereof that are coupled to one another, integrated with or coupled to one or more of the units or robots described in FIG. 1 above, or a combination thereof.

The control unit 202 can be implemented in a number of different ways. For example, the control unit 202 can be a processor, an application specific integrated circuit (ASIC), an embedded processor, a microprocessor, a hardware control logic, a hardware finite state machine (FSM), a digital signal processor (DSP), or a combination thereof. The control unit 202 can execute software and/or instructions to provide the intelligence of the robotic system 100.

The control unit 202 can be operably coupled to the user interface 210 to provide a user with control over the control unit 202. The user interface 210 can be used for communication between the control unit 202 and other functional units in the robotic system 100. The user interface 210 can also be used for communication that is external to the robotic system 100. The user interface 210 can receive information from the other functional units or from external sources, or can transmit information to the other functional units or to external destinations. The external sources and the external destinations refer to sources and destinations external to the robotic system 100.

The user interface 210 can be implemented in different ways and can include different implementations depending on which functional units or external units are being interfaced with the user interface 210. For example, the user interface 210 can be implemented with a pressure sensor, an inertial sensor, a microelectromechanical system (MEMS), optical circuitry, waveguides, wireless circuitry, wireline circuitry, application programming interface, or a combination thereof.

The storage unit 204 can store the software instructions, master data, tracking data or a combination thereof. For illustrative purposes, the storage unit 204 is shown as a single element, although it is understood that the storage unit 204 can be a distribution of storage elements. Also for illustrative purposes, the robotic system 100 is shown with the storage unit 204 as a single hierarchy storage system, although it is understood that the robotic system 100 can have the storage unit 204 in a different configuration. For example, the storage unit 204 can be formed with different storage technologies forming a memory hierarchal system including different levels of caching, main memory, rotating media, or off-line storage.

The storage unit 204 can be a volatile memory, a non-volatile memory, an internal memory, an external memory, or a combination thereof. For example, the storage unit 204 can be a nonvolatile storage such as non-volatile random access memory (NVRAM), Flash memory, disk storage, or a volatile storage such as static random access memory (SRAM). As a further example, storage unit 204 can be a non-transitory computer medium including the non-volatile memory, such as a hard disk drive, NVRAM, solid-state storage device (SSD), compact disk (CD), digital video disk (DVD), or universal serial bus (USB) flash memory devices. The software can be stored on the non-transitory computer readable medium to be executed by a control unit 202.

The storage unit 204 can be operably coupled to the user interface 210. The user interface 210 can be used for communication between the storage unit 204 and other functional units in the robotic system 100. The user interface 210 can also be used for communication that is external to the robotic system 100. The user interface 210 can receive information from the other functional units or from external sources, or can transmit information to the other functional units or to external destinations. The external sources and the external destinations refer to sources and destinations external to the robotic system 100.

Similar to the discussion above, the user interface 210 can include different implementations depending on which functional units or external units are being interfaced with the storage unit 204. The user interface 210 can be implemented with technologies and techniques similar to the implementation of the user interface 210 discussed above.

In some embodiments, the storage unit 204 is used to further store and provide access to processing results, predetermined data, thresholds, or a combination thereof. For example, the storage unit 204 can store the master data that includes descriptions of the one or more target objects 112 (e.g., boxes, box types, cases, case types, products, and/or a combination thereof). In one embodiment, the master data includes dimensions, predetermined shapes, templates for potential poses and/or computer-generated models for recognizing different poses, a color scheme, an image, identification information (e.g., bar codes, quick response (QR) codes, logos, and the like), expected locations, an expected weight, and/or a combination thereof, for the one or more target objects 112 expected to be manipulated by the robotic system 100.

In some embodiments, the master data includes manipulation-related information regarding the one or more objects that can be encountered or handled by the robotic system 100. For example, the manipulation-related information for the objects can include a center-of-mass location on each of the objects, expected sensor measurements (e.g., for force, torque, pressure, and/or contact measurements), corresponding to one or more actions, maneuvers, or a combination thereof.

The communication unit 206 can enable external communication to and from the robotic system 100. For example, the communication unit 206 can enable the robotic system 100 to communicate with other robotic systems or units, external devices, such as an external computer, an external database, an external machine, an external peripheral device, or a combination thereof, through a communication path 218, such as a wired or wireless network.

The communication path 218 can span and represent a variety of networks and network topologies. For example, the communication path 218 can include wireless communication, wired communication, optical communication, ultrasonic communication, or the combination thereof. For example, satellite communication, cellular communication, Bluetooth, Infrared Data Association standard (lrDA), wireless fidelity (WiFi), and worldwide interoperability for microwave access (WiMAX) are examples of wireless communication that can be included in the communication path 218. Cable, Ethernet, digital subscriber line (DSL), fiber optic lines, fiber to the home (FTTH), and plain old telephone service (POTS) are examples of wired communication that can be included in the communication path 218. Further, the communication path 218 can traverse a number of network topologies and distances. For example, the communication path 218 can include direct connection, personal area network (PAN), local area network (LAN), metropolitan area network (MAN), wide area network (WAN), or a combination thereof. The robotic system 100 can transmit information between the various units through the communication path 218. For example, the information can be transmitted between the control unit 202, the storage unit 204, the communication unit 206, the I/O device 208, the actuation devices 212, the transport motors 214, the sensor units 216, or a combination thereof.

The communication unit 206 can also function as a communication hub allowing the robotic system 100 to function as part of the communication path 218 and not limited to be an end point or terminal unit to the communication path 218. The communication unit 206 can include active and passive components, such as microelectronics or an antenna, for interaction with the communication path 218.

The communication unit 206 can include a communication interface 248. The communication interface 248 can be used for communication between the communication unit 206 and other functional units in the robotic system 100. The communication interface 248 can receive information from the other functional units or from external sources, or can transmit information to the other functional units or to external destinations. The external sources and the external destinations refer to sources and destinations external to the robotic system 100.

The communication interface 248 can include different implementations depending on which functional units are being interfaced with the communication unit 206. The communication interface 248 can be implemented with technologies and techniques similar to the implementation of the control interface 240.

The I/O device 208 can include one or more input sub-devices and/or one or more output sub-devices. Examples of the input devices of the I/O device 208 can include a keypad, a touchpad, soft-keys, a keyboard, a microphone, sensors for receiving remote signals, a camera for receiving motion commands, or any combination thereof to provide data and communication inputs. Examples of the output device can include a display interface. The display interface can be any graphical user interface such as a display, a projector, a video screen, and/or any combination thereof.

The control unit 202 can operate the I/O device 208 to present or receive information generated by the robotic system 100. The control unit 202 can operate the I/O device 208 to present information generated by the robotic system 100. The control unit 202 can also execute the software and/or instructions for the other functions of the robotic system 100. The control unit 202 can further execute the software and/or instructions for interaction with the communication path 218 via the communication unit 206.

The robotic system 100 can include physical or structural members, such as robotic manipulator arms, that are connected at joints for motion, such as rotational displacement, translational displacements, or a combination thereof. The structural members and the joints can form a kinetic chain configured to manipulate an end-effector, such as a gripping element, to execute one or more task, such as gripping, spinning, or welding, depending on the use or operation of the robotic system 100. The robotic system 100 can include the actuation devices 212, such as motors, actuators, wires, artificial muscles, electroactive polymers, or a combination thereof, configured to drive, manipulate, displace, reorient, or a combination thereof, the structural members about or at a corresponding joint. In some embodiments, the robotic system 100 can include the transport motors 214 configured to transport the corresponding units from place to place.

The robotic system 100 can include the sensor units 216 configured to obtain information used to execute tasks and operations, such as for manipulating the structural members or for transporting the robotic units. The sensor units 216 can include devices configured to detect or measure one or more physical properties of the robotic system 100, such as a state, a condition, a location of one or more structural members or joints, information about objects or surrounding environment, or a combination thereof. As an example, the sensor units 216 can include imaging devices, system sensors, contact sensors, and/or any combination thereof.

In some embodiments, the sensor units 216 include one or more imaging devices 222. The imaging devices 222 are devices configured to detect and image the surrounding environment. For example, the imaging devices 222 can include 2-dimensional cameras, 3-dimensional cameras, both of which can include a combination of visual and infrared capabilities, lidars, radars, other distance-measuring devices, and other imaging devices. The imaging devices 222 can generate a representation of the detected environment, such as a digital image or a point cloud, used for implementing machine/computer vision for automatic inspection, robot guidance, or other robotic applications. As described in further detail below, the robotic system 100 can process the digital image, the point cloud, or a combination thereof via the control unit 202 to identify the target object 112 of FIG. 1, a pose of the target object 112 of, or a combination thereof. For manipulating the target object 112, the robotic system 100 can capture and analyze an image of a designated area, such as inside the truck, inside the container, or a pickup location for objects on the conveyor belt, to identify the target object 112 and the object source 114 of FIG. 1 thereof. Similarly, the robotic system 100 can capture and analyze an image of another designated area, such as a drop location for placing objects on the conveyor belt, a location for placing objects inside the container, or a location on the pallet for stacking purposes, to identify the task location 116 of FIG. 1.

In some embodiments, the sensor units 216 can include system sensors 224. The system sensors 224 can monitor the robotic units within the robotic system 100. For example, the system sensors 224 can include units or devices to detect and monitor positions of structural members, such as the robotic arms and the end-effectors, corresponding joints of robotic units or a combination thereof. As a further example, the robotic system 100 can use the system sensors 224 to track locations, orientations, or a combination thereof of the structural members and the joints during execution of the task. Examples of the system sensors 224 can include accelerometers, gyroscopes, or position encoders.

In some embodiments, the sensor units 216 can include the contact sensors 226, such as pressure sensors, force sensors, strain gauges, piezoresistive/piezoelectric sensors, capacitive sensors, elastoresistive sensors, torque sensors, linear force sensors, other tactile sensors, and/or any other suitable sensors configured to measure a characteristic associated with a direct contact between multiple physical structures or surfaces. For example, the contact sensors 226 can measure the characteristic that corresponds to a grip of the end-effector on the target object 112 or measure the weight of the target object 112. Accordingly, the contact sensors 226 can output a contact measure that represents a quantified measure, such as a measured force or torque, corresponding to a degree of contact or attachment between the gripping element and the target object 112. For example, the contact measure can include one or more force or torque readings associated with forces applied to the target object 112 by the end-effector.

Suitable Robotic Object-Gripping Systems

Figure 3:
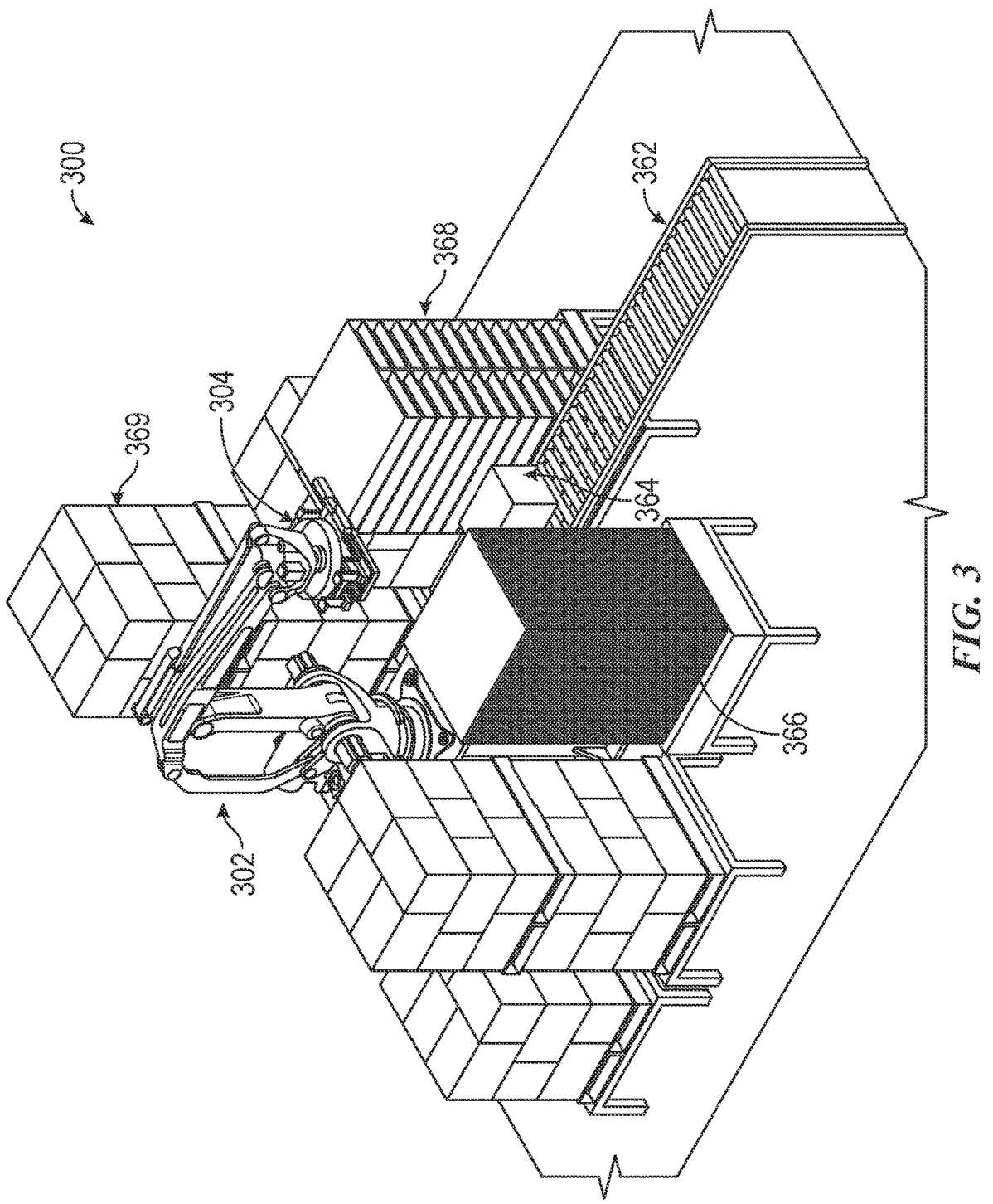
FIG. 3 is an illustration of a robotic object gripping system in accordance with some embodiments of the present technology.

FIG. 3 is an illustration of an object-gripping system 300 (e.g., a station for a multi-purpose unit) in accordance with some embodiments of the present technology. In the illustrated embodiment, the object-gripping system 300 includes a robotic arm 302 and an object-gripping assembly 304 (sometimes also referred to herein as a "gripping assembly," an "object gripper," a "gripper," and/or a "gripping head") coupled to the robotic arm 302.

The object-gripping system 300 can be configured to pick up, grip, transport, release, load, and/or unload various types or categories of objects. For example, in the illustrated embodiment, the robotic arm 302 is positioned at the end of a conveyor belt 362, and the object-gripping assembly 304 is configurable to grip at least varying categories of objects that are differentiated based on their dimensional size (e.g., length, width, height, etc.), their weight, the availability (or lack thereof) of a clamping location, surface materials, surface textures, rigity, and the like. In the illustrated embodiment, the object-gripping assembly 304 is configurable to grip at least three categories of objects: (1) various boxes 364 (e.g., shipping boxes, shipping units, package units, cartons, consumer goods, foodstuffs, and the like), (2) slip sheets 366, and (3) pallets 368 to pack shipping units 369 (e.g., palletized containers that are used in large-scale distribution). Purely by way of example, the first category (i.e., the boxes 364) is typically indicated by a relatively small length and width compared to the second category (i.e., the slip sheets 366) and the third category (i.e., the pallets 368); a surface that can be engaged by a vacuum force; and/or a relatively rigid exterior. In another example, the second category is typically indicated by a relatively large length and width compared to the first category; a surface that can be engaged by a suction force; and/or a material that may require a wide grip to remain rigid during transport (e.g., flexible material, such as a paper or cardboard sheet). In yet another example, the second category is typically indicated by a relatively large length and width compared to the first category; available clamping locations; and/or a rigid material (e.g., wood). Because each of the categories have varying features, the categories can require the object-gripping assembly 304 to be adjusted between tasks to pick up, transport, and/or place objects in the various categories.

During a packing operation, the robotic arm 302 can use the multi-purpose object-gripping assembly 304 to sequentially implement a variety of tasks (e.g., different pick up, transfer, and placement tasks). The robotic arm 302 can combine the different types of tasks to implement a complete operation at a single station (e.g., to pack a shipping unit with the appropriate objects). In a specific, non-limiting example, the robotic arm 302 can be used to implement a shipment packing operation (picking up a variety of objects such as various packages, pallets, slip sheets, and the like) at a single station without replacing any components or devices and/or without direct operator actions.

During a packing operation, for example, the object-gripping assembly 304 can be reconfigured between various modes that are suitable to grip the boxes 364, slip sheets 366, pallets 368, and/or any other suitable object (sometimes referred to collectively herein as a target object); engage with the target object; transport the target object to one of the shipping units 369 in conjunction with the robotic arm 302; and disengage the target object to pack the shipping unit 369. For example, as further illustrated in FIG. 3, the object-gripping system 300 can stack one of the pallets 368 at the base of a shipping unit 369; stack one of the slip sheets 366 on the pallet 368; stack a layer of the boxes 364 (e.g., three boxes, five boxes, ten boxes, or any other suitable number) on the slip sheet 366; then repeat any of the preceding steps/tasks to complete the shipping unit 369 and/or start a new one. In the context of the packing operation, FIG. 3 can illustrate the boxes 364, the slip sheets 366, and the pallets 368 located at the start locations the respective tasks. The shipping unit 369 can correspond to a common target/destination location for the different tasks.

Additionally, or alternatively, the object-gripping system 300 can be used to unpack the shipping units 369 (or any other group of objects). During the unpacking operation, the object-gripping assembly 304 can be reconfigured between various modes that are suitable to grip a variety of target objects; engaged with one of the target objects; transported from the shipping units 369 to a destination (e.g., the conveyor belt 362 and/or a holding location) by the robotic arm 302; and disengaged with from the gripped target object. For example, the object-gripping system 300 can move a layer of the boxes 364 in the shipping unit 369 onto the conveyor belt (or another suitable destination); move the slip sheet 366 corresponding to the layer to a waiting pile (e.g., to be reused and/or disposed); repeat the previous steps for each layer of the boxes 364 in the shipping unit 369; then move the pallet 368 to a waiting pile (e.g., to be reused and/or disposed of). The unpacking operation can then repeat these steps/tasks to unload another shipping unit 369.

Accordingly, in the context of the unpacking operation, FIG. 3 can illustrate the shipping unit 369 as a common starting location for the respective tasks. The boxes 364, the slip sheets 366, and the pallets 368 can represent the target/destination locations for the respective tasks.

In some embodiments, the object-gripping system 300 includes a machine-vision component (e.g., the imaging device 222 of FIG. 2, the processor 202 of FIG. 2, or a combination thereof). The machine vision component can image a target object (e.g., any of the boxes 364, slip sheets 366, and/or pallets 368), identify the target object, identify an orientation of the target object, identify variances in the target object from an expectation (e.g., identify deviations in the length and/or width of the target object), and/or identify objects that may prevent the object-gripping system 300 from gripping the target object. The object-gripping system 300 and/or any controller operably coupled thereto (e.g., the controller 109 of FIG. 1) can then adjust the configuration of the object-gripping assembly 304 according to the target object and control movement of the robotic arm to complete an operation (e.g., the packing and/or unpacking operations discussed above).

In each of the operations discussed above, the object-gripping assembly 304 is adjusted between various modes specific to the object being gripped during any given task. This adjustment, discussed in more detail below, can allow the object-gripping assembly 304 to more firmly grip varying target objects, account for minor variations in the target objects being gripped, and/or become compact when clearance for a task of an operation is limited (e.g., when packing and/or unpacking a shipping unit in a confined space).

Figure 4:
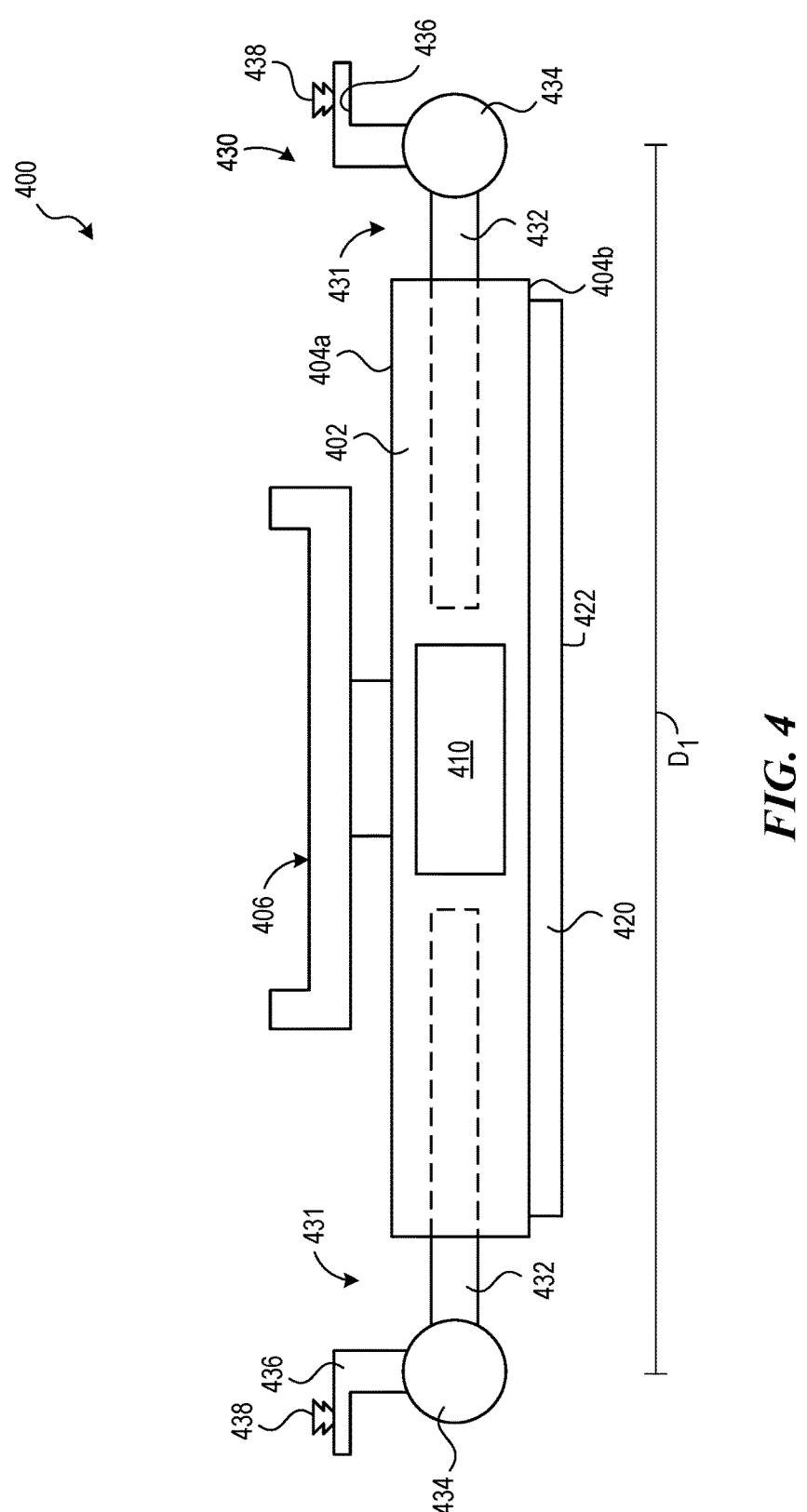
FIG. 4 is a schematic sideview of an object-gripping assembly in accordance with some embodiments of the present technology.

For example, FIG. 4 is a schematic side view of an object-gripping assembly 400 (e.g., a multi-purpose end-effector) in accordance with some embodiments of the present technology. In the illustrated embodiment, the object-gripping assembly 400 ("assembly 400") includes a main body 402 (sometimes also referred to herein as a "housing") that has an upper surface 404a and a lower surface 404b. The assembly 400 also includes an external connector 406 (also referred to herein as an "interface component") coupled to the upper surface 404a, an imaging component 410 coupled to the main body 402, and a vacuum-operated gripping component 420 coupled to the lower surface 404b.

The external connector 406 is couplable to another component of an object-gripping system, such as the robotic arm 302 of FIG. 3, to allow the position and/or orientation of the assembly 400 to be controlled. In some embodiments, the external connector 406 allows the main body 402 to be rotatable about a vertical axis through the external connector 406. The imaging component 410, as discussed above, can obtain images of one or more target objects (and any obstacles thereto) that are used to identify the target object and plan a task to engage the target object (e.g., based on dynamic computation of mixed stock-keeping unit (SKU) object detection, area and/or resource detection for pallet and/or slips, packing computation, and the like).

For example, the vacuum-operated gripping component 420 is positioned to engage a surface of a first category of a target object (e.g., the boxes 364 of FIG. 3) beneath the assembly 400 to lift the target object. In some embodiments, the vacuum-operated gripping component 420 includes a foam vacuum gripper, which can engage and lift a target object with any portion of a lower surface 422 of the vacuum-operated gripping component 420 (e.g., lifting an object that is engaged by 10 percent, 20 percent, 25 percent, 50 percent, and/or any other suitable portion of the lower surface 422). In various embodiments, the vacuum-operated gripping component 420 can include one or more suction cups, vacuum pads, vacuum openings, and the like configured to grip or affix the target object to the assembly 400.

As further illustrated in FIG. 4, the assembly 400 can also include a variable-width gripping component 430 coupled to the main body 402 (e.g., movably positioned at least partially within the main body 402). The variable-width gripping component 430 ("gripping component 430") includes a linear extension mechanism 431 defined by two arms 432 that are on opposing longitudinal sides of the main body 402. Each of the arms 432 has a proximal portion (or "proximal end region") that is coupled to the main body 402 and a distal portion (or "end region") protruding from the main body 402 on the opposing longitudinal sides. The gripping component 430 also includes one or more rotational components 434 (one shown, sometimes also referred to herein as a "rotational mechanism") coupled to the end regions of each of the arms 432 and one or more mechanical gripping components 436 (one shown) coupled to each of the rotational components 434. Further, in the illustrated embodiment, the gripping component 430 includes one or more optional suction components 438 coupled to the mechanical gripping component 436.

In various embodiments, the rotational components 434 can include mechanically driven wheels, pneumatically-driven wheels (e.g., air cylinder driven wheels), mechanically driven axels and/or crank shafts, robotically controlled rotating components, and the like. In various embodiments, the mechanical gripping components 436 can include various clamps, vises, claws, servo-electric grippers, pneumatic grippers, platform-based lifters, and the like.

In the configuration of the assembly 400 illustrated in FIG. 4 (e.g., a fully folded state), the arms 432 of the linear extension mechanism 431 are fully retracted into the main body 402 and the rotational components 434 are in a raised position. In the raised position, the rotational components 434 direct each of the mechanical gripping components 436 at least partially upward from a longitudinal plane of the lower surface 404b. In the illustrated embodiment, the rotational components 434 direct the mechanical gripping components 436 fully vertical with respect to the longitudinal plane. This embodiment can minimize the longitudinal footprint of the assembly 400 in the fully folded state, allowing the assembly 400 to access areas with relatively low amounts of clearance.

During some tasks of an operation, as discussed in more detail below, the rotational components 434 can be actioned/dynamically configured into a lowered position, thereby directing the mechanical gripping components 436 and the suction components 438 below the lower surface 404b. As a result, the mechanical gripping components 436 can engage and/or disengage a different category of a target object (e.g., the third category, such as including the pallets 368 of FIG. 3). Additionally, or alternatively, the suction components 438 can engage and/or disengage yet another category of a target object (e.g., the second category, such as including the slip sheets 366 of FIG. 3). Additionally, each of the arms 432 can be actioned/dynamically configured (e.g., extended, expanded, moved relative to the main body 402, and the like) to extend and/or retract a distance $D_1$ between the end regions. The extension and/or retraction allow the gripping component 430 to be adjusted according to relevant dimensions of the target object (e.g., thereby accounting for variances within the second and/or third category). Purely by way of example, in various embodiments, the distance $D_1$ between the end regions of the arms

432 can be adjusted between about 540 millimeters (mm) and about 1000 mm, or between about 740 mm and about 1300 mm. In some embodiments, the arms 432 are extended and retracted in tandem (e.g., symmetrically and/or simultaneously). In some embodiments, each of the arms 432 is independently extendable and retractable, allowing for additional customization to a target object.

Figures 5A, 5B:
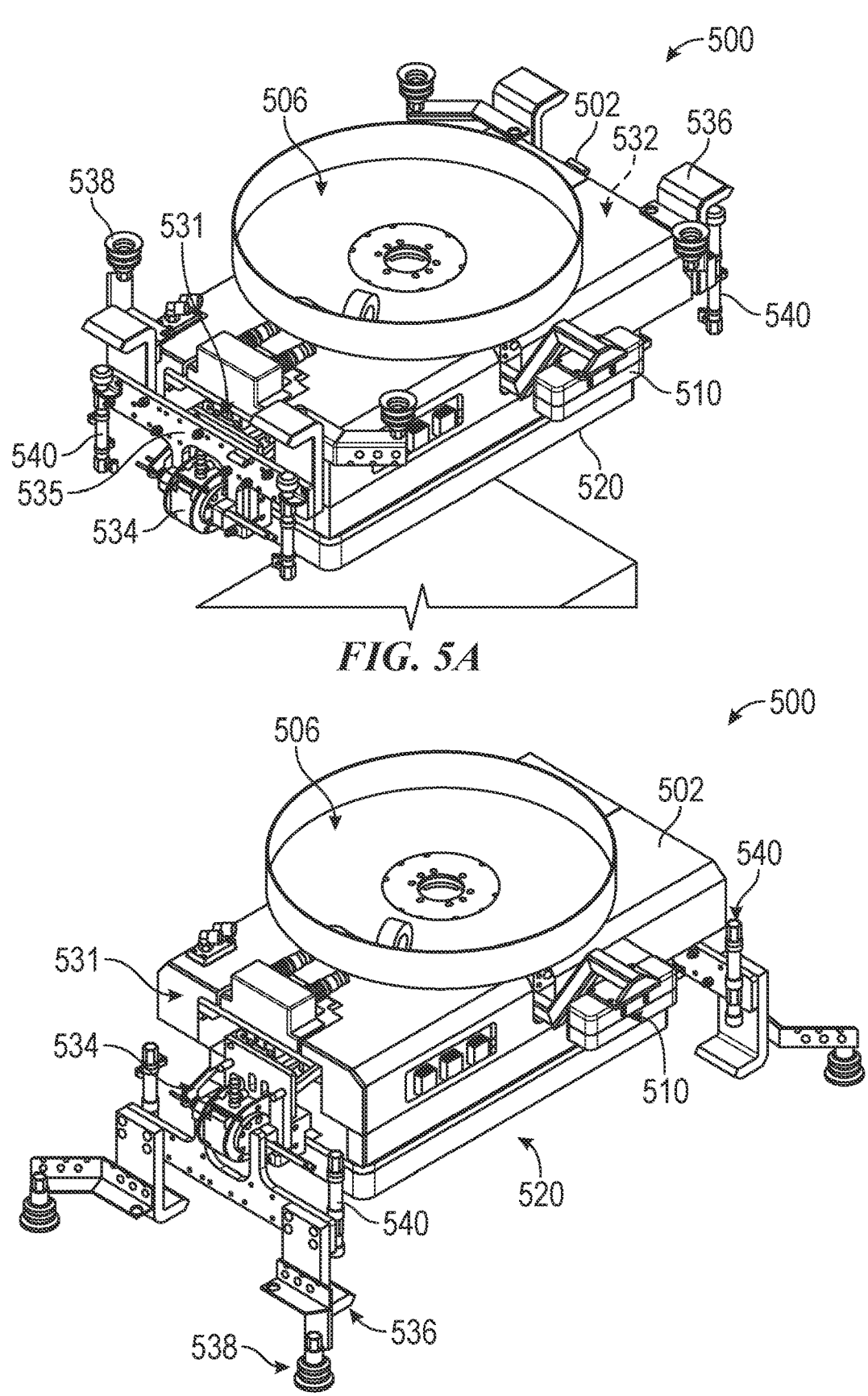
FIGS. 5A and 5B are isometric views of an object-gripping assembly in accordance with some embodiments of the present technology.

FIGS. 5A and 5B are isometric views of an object-gripping assembly 500 (e.g., a multi-purpose end-effector) in accordance with some embodiments of the present technology. As illustrated in FIGS. 5A and 5B, the object-gripping assembly 500 ("assembly 500") is generally similar to the assembly 400 of FIG. 4. For example, the assembly 500 includes a main body 502, as well as an external connector 506, an imaging component 510, and a vacuum-operated gripping component 520 coupled to the main body 502. Further, the assembly 500 includes a variable-width gripping component 530 that is coupled to the main body 502.

The variable-width gripping component 530 ("gripping component 530") includes a linear mechanism 531 having arms 532 on opposing sides of the main body 502 and rotational components 534 coupled to end regions of each of the arms 532. The gripping component 530 also includes a support plate 535 coupled to each of the rotational components 534, one or more mechanical gripping components 536 coupled to each of the support plates 535 (two shown for each of the support plates 535), an optional suction component 538 coupled to each of the mechanical gripping components 536 (e.g., four total), and one or more optional press cylinders 540 coupled to each of the support plates 535 (two shown for each of the support plates 535) adjacent to the mechanical gripping components 536.

In the illustrated embodiment, the mechanical gripping components 536 are the static portion of a clamp. To grip a target object (sometimes also referred to herein as picking or lifting the target object), the mechanical gripping components 536 can be inserted beneath a surface, then the gripping component 530 can be lifted. In turn, the press cylinders 540 can help stabilize the target object during the gripping operation by acting as the variable component of the clamp. For example, after the mechanical gripping components 536 begin to lift the target object, the press cylinders 540 can expand to hold the target object against the mechanical gripping components 536. Additional details on an example of the stabilization are discussed below with reference to FIGS. 10A-10E.

The support plates 535 allow the rotational components 534 on each of the end regions to move each of the mechanical gripping components 536, suction components 538, and the press cylinders 440 between a raised position (FIG. 5A) and a lowered position (FIG. 5B). Additionally, or alternatively, the support plates 535 can help position the mechanical gripping components 536, suction components 538, and the press cylinders 540 in a longitudinal plane. For example, as best illustrated in FIG. 5B, the support plates 535 can allow the mechanical gripping components 536 and/or the suction components 538 on each longitudinal end of the gripping component 530 to be spaced apart from each other. Additionally, or alternatively, the support plates 535 allow optional components to be included with the gripping component 530. For example, in the embodiment illustrated in FIGS. 5A and 5B, the support plates 535 provide a space for the press cylinders 540 to be mounted in the gripping component 530.

Figures 6A, 6B, 6C:
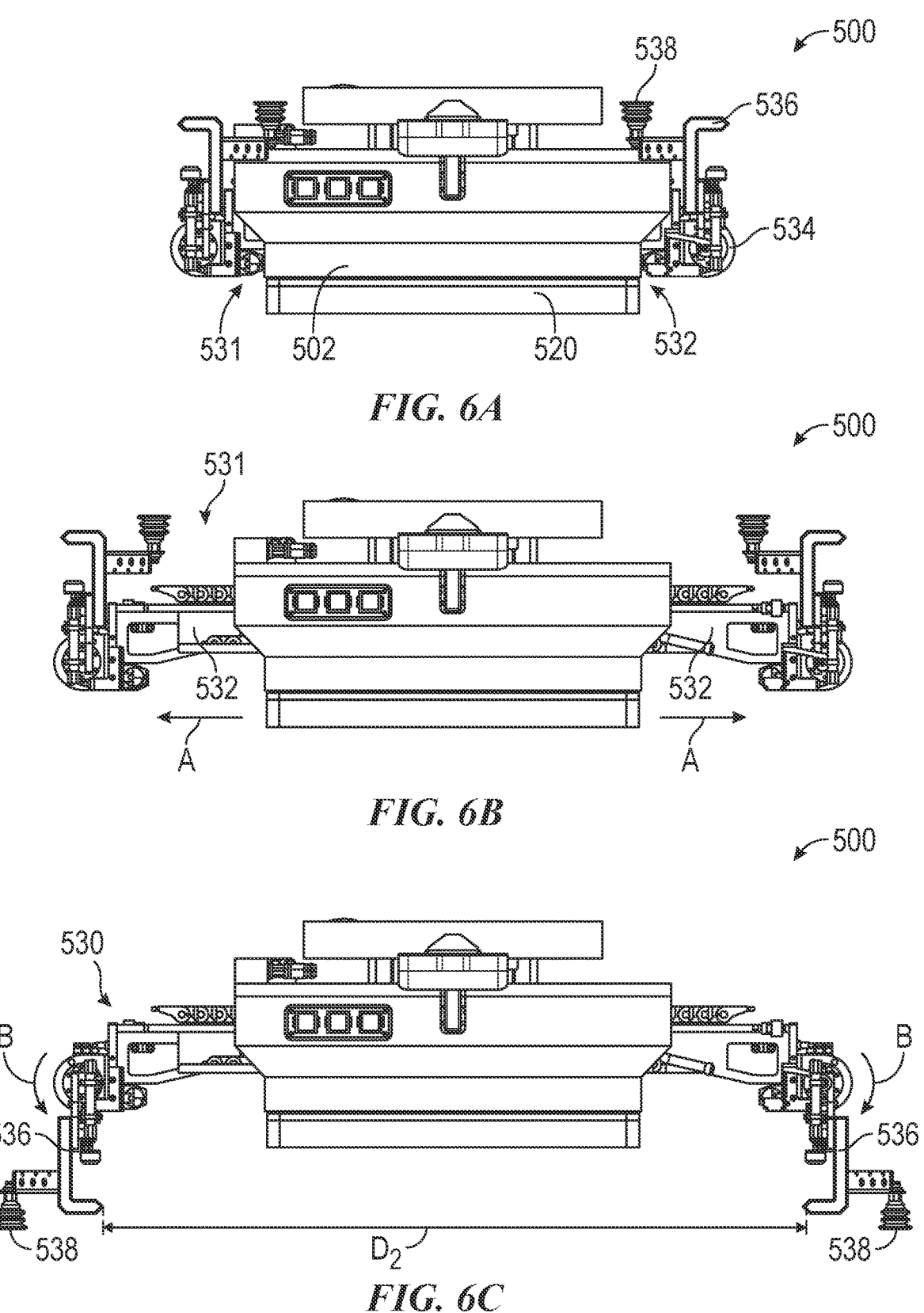
FIGS. 6A-6C illustrate the object-gripping assembly of FIGS. 5A and 5B in various states in accordance with some embodiments of the present technology.

FIGS. 6A-6C illustrate the assembly 500 of FIGS. 5A and 5B in various states in accordance with some embodiments of the present technology. More specifically, FIG. 6A illustrates the assembly 500 in the fully folded state, FIG. 6B illustrates the assembly 500 in one of many possible extended states, and FIG. 6C illustrates the assembly 500 in a clamping state.

In the fully folded state illustrated in FIG. 6A (sometimes also referred to herein as a "collapsed state," a "vacuum gripping configuration," and/or a "folded configuration"), the arms 532 of the linear mechanism 531 are fully retracted and/or collapsed into the main body 502 and the rotational components 534 are in a raised position to direct the mechanical gripping components 536 and the suction components 538 in a vertical direction. The fully folded state results in a relatively small footprint (or minimum footprint) for the assembly 500. The relatively small footprint can allow the assembly 500 to be moved into, out of, and/or through spaces with limited clearance. Additionally, as further illustrated in FIG. 6A, the fully folded state can allow the vacuum-operated gripping component 520 to define a lowermost surface of the assembly 500. As a result, the outer surface 522 of the vacuum-operated gripping component 520 can engage various target objects for various picking tasks of an operation.

To transition from the fully folded state to an extended state, as illustrated in FIG. 6B, the assembly 500 can action the arms 532 of the linear mechanism 531 along longitudinal paths A. In various embodiments, the actuation can be driven by various mechanically driven actuators and/or gears, pneumatically driven actuators (e.g., air-driven cylinders), robotically controlled components, and the like. The assembly 500 can have any suitable number of extended states. For example, in some embodiments, the assembly 500 has only a single extended state corresponding to a fixed width for a target object. In various other examples, the assembly 500 can have two, three, five, ten, twenty, or any other suitable extended states, allowing the assembly 500 to expand to engage with a variety of target objects and/or accommodate variances in the width of a target object. In some embodiments, the arms 532 of the linear mechanism 531 are moveable in a continuous, thereby allowing assembly 500 to be in any extended state between the fully folded state and a maximum-extended state. In various embodiments, the extended state can be based on or more preset conditions (e.g., set widths for particular target objects), measurements performed by the imaging component 510 (FIG. 5A), and/or various controller inputs (e.g., allowing for inputs from a human and/or robotic operator).

To transition into the clamping state, as illustrated in FIG. 6C, the assembly 500 can action the rotational components 534 along rotational paths B. The motion moves the mechanical gripping components 536 and the suction components 538 from the raised position into a lowered position. As a result, the mechanical gripping components 536 and the suction components 538 are positioned lower than the vacuum-operated gripping component 520, thereby allowing the mechanical gripping components 536 and/or the suction components 538 to engage a target object. For example, as the mechanical gripping components 536 rotate into the lowered position, the distance between the opposing mechanical gripping components 536 contracts toward a second distance $D_2$. As a result, a target object with a width that is generally equal to the second distance $D_2$ can be gripped by the mechanical gripping components 536 pinching together and/or can be lifted by the platform defined by the distal ends of the mechanical gripping components 536. In another example, as the suction components 538 rotate into the lowered position, the suction components 538 are directed downward to engage the upper surface of a target object.

In some embodiments, the extended state (FIG. 6B) acts as an intermediary state between the fully folded state and the clamping state. That is, while transitioning from the fully folded state to the clamping state, the assembly 500 first extends the arms 532 of the linear mechanism 531 to transition into the extended state illustrated in FIG. 6B. Additionally, or alternatively, the assembly 500 can transition to the clamping state directly from the fully folded state (FIG. 6A). As a result, the assembly can be adjusted to grip a variety of target objects with varying dimensions. In various embodiments, the configuration of the variable width gripping component 530 in the clamping state can be based on an object identification from the imaging component 510 (FIG. 5A), one or more measurements from the imaging component 510, one or more presets for an identified target object, various controller inputs (e.g., allowing for inputs from a human and/or robotic operator), and the like.

Further, although discussed primarily herein as transitioning to the clamping state after expanding to a desired width (e.g., transitioning from either the fully folded state and/or any of the extended states based on the desired width), the assembly 500 can transition into the clamping state before and/or concurrent with the expansion. Purely by way of example, the assembly 500 can dynamically configure the rotational components 534 along rotational paths B (FIG. 6C) while also dynamically configuring the arms 532 of the linear mechanism 531 along longitudinal paths A (FIG. 6B). In another example, the assembly 500 can action the rotational components 534, then action the arms 532 of the linear mechanism 531. Indeed, in some embodiments (e.g., when performing successive tasks with the mechanical gripping components 536 and/or the suction components 538), the assembly 500 actions the rotational components 534 once, then actions the arms 532 of the linear mechanism 531 multiple times to adjust the width according to varying target objects. Additionally, or alternatively, the assembly 500 can action the arms 532 of the linear mechanism 531 between expansion states to facilitate clamping a target object (e.g., reducing the width between opposing mechanical gripping components 536 to clamp the target object).

Figure 7:
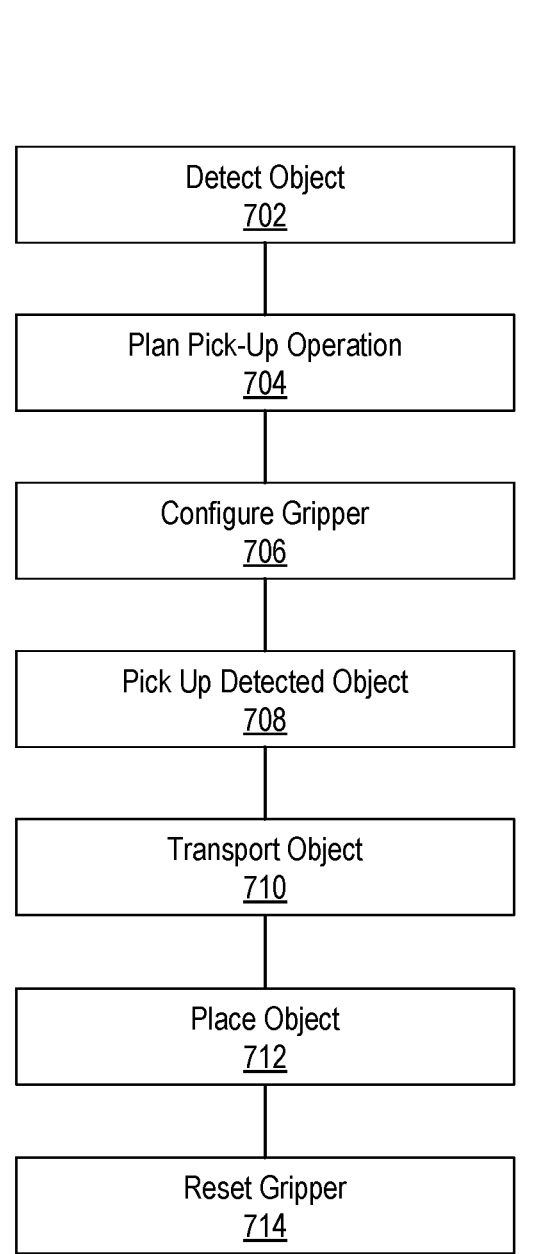
FIG. 7 is a flow diagram of a process for operating a robotic system with an object-gripping assembly in accordance with some embodiments of the present technology.

FIG. 7 is a flow diagram of a process 700 for operating a robotic system with an object-gripping assembly in accordance with some embodiments of the present technology. The process 700 can be executed by a controller on the end effector itself and/or by an external controller (e.g., the controller 109 of FIG. 1 having the processor 202 of FIG. 2).

The process 700 begins at block 702 by detecting a target object. The detection can be based on image data from an image sensor and/or imaging system on the object gripping assembly (e.g., the imaging component 410 of FIG. 4). In some embodiments, the detection is based at least partially on a machine or computer vision algorithm for recognizing patterns in the image data to detect one or more known target objects and/or reject an imaged object as a non-target object. In some embodiments, the detection is based at least partially on an artificial intelligence and/or machine learning algorithm trained to identify objects (target and non-target) in image data. In various embodiments, the detection can be based at least partially on inputs from various sensors (e.g., weight sensors, external imaging sensors, and the like) and/or inputs from a human and/or robotic operator.

In addition to detecting the target object at block 702, the process 700 can detect various aspects of the target object.

For example, the process 700 can detect dimensions of the target object, an orientation of the target object, clearance around the target object for a task during a gripping operation, and the like. These detections can allow the process 700 to, for example, account for variances from expectations when a target object is identified.

Because the image sensor and/or imaging system is coupled to the object gripping assembly, the image sensor and/or imaging system will often image the target object (and/or any surroundings) at an angle with respect to a vertical axis, rather than from directly above. Accordingly, the machine or computer vision algorithm can include functions that account for the angled image (e.g., by applying a distortion or other corrective filter to the image data). Additionally, or alternatively, the machine or computer vision algorithm can include functions that identify when the target object (and/or any surroundings) are not being imaged head on and take corrective actions. In some embodiments, the corrective actions include applying one or more distortions and/or image corrections to the image data to measure a single side of the target object. In some embodiments, the corrective actions include generating instructions for additional image data to be collected to properly image the target object. By identifying and accounting for angles in the image data, the machine or computer vision algorithm can help improve the accuracy of the measurements and/or the following stages of a gripping operation.

Furthermore, because the image sensor and/or imaging system is coupled to the object gripping assembly, the location of the image sensor and/or imaging system can be dynamically controlled throughout an operation. For example, as a stack of slipsheets and/or pallets shrinks (or increases) during a packing operation, the object gripping assembly can be lowered (or raised) to image the slipsheets and/or pallets at a consistent distance. That is, the dynamic control of the location of the image sensor and/or imaging system can allow the image data to have a consistent distance between the image sensor and/or imaging system and a target object. In turn, the consistent distance can help improve the accuracy of the measurements and/or the following stages of a gripping operation.

At block 704, the process 700 includes planning a pick-up task for the target object. Planning the pick-up task can include determining which state the object-gripping assembly should be in to pick up the target object (e.g., the fully folded state, a combination of the fully folded state and the clamping state, and/or a combination of an extended state and the clamping state). Planning the pick-up task can also include identifying an orientation for the target object during the pick-up task and/or a travel path for the object-gripping assembly during the pick-up task. The orientation can be based on the dimensions and orientation of the target object and/or the available surfaces. The travel path can be based on any identified environmental constraints (e.g., objects limiting clearance identified around the object).

At block 706, the process 700 includes configuring the object-gripping assembly into the gripping state determined at block 704. The configuration can include any of the actioning discussed above with respect to FIGS. 6A-6C to prepare to grip the target object with a vacuum-operated gripping component, a mechanical gripping component, and/or a suction component. In some embodiments, configuring the object gripping assembly includes multiple steps to dynamically configure the object-gripping assembly (e.g., expanding the arms of a linear mechanism, then actioning rotational components from a raised position to a lowered position). In some embodiments, configuring the object gripping assembly includes a single step with multiple actions (e.g., expanding the arms of a linear mechanism and rotating the raised position to the lowered position at the same time).

At block 708, the process 700 includes picking up the target object. In some embodiments, picking up the target object includes engaging a surface of the target object with the vacuum-operated gripping component and applying a vacuum force to the engaged surface. In some embodiments, picking up the target object includes clamping the target object with the mechanical gripping components. In some embodiments, picking up the target object includes positioning mechanical gripping components at least partially beneath a gripping surface of the target object. In some embodiments, picking up the target object includes engaging a surface of the target object with the suction component(s) and applying a suction force to the engaged surface.

At block 710, the process 700 includes transporting the target object from a first location (e.g., the pick-up location) to a second location (e.g., a drop-off location). The transportation can be based on the predetermined travel path to avoid collisions with any objects in the surrounding environment. In a specific, non-limiting example, the first location can be a conveyor belt that transports boxes of a consumer product to a loading station with the robotic system while the second location is a large-scale shipping component (e.g., a pallet stack, a larger box, a shipping container, and the like). In this example, the process 700 can automate the packing of a variety of objects for shipping without rotating between various object-gripping systems, thereby accelerating the packing process.

At block 712, the process 700 includes placing the target object at the second location. In some embodiments, the placing process at block 712 includes a precise placement of the object at the second location (e.g., in a packed position in a large-scale shipping component). In some embodiments, the placing process at block 712 includes avoiding any environmental objects at the second location (e.g., previously placed target objects).

At optional block 714, the process 700 includes resetting the object-gripping assembly. Resetting the object-gripping assembly can include collapsing the object-gripping assembly into the fully folded state from any extended and/or clamping state. The collapsing process can allow the object-gripping assembly to avoid other environmental objects at the second location more easily (e.g., previously placed objects) and/or when picking up a new target object. Additionally, or alternatively, resetting the object-gripping assembly can include returning the object-gripping assembly to a start location to detect a next target object. In some embodiments, however, the object-gripping assembly does not reset (or fully reset) between target objects (e.g., does not transition out of a clamping state). The absence of a reset can allow the object-gripping assembly to more quickly conduct a series of picking tasks for a complete operation, especially for generally similar target objects.

Figure 8A:
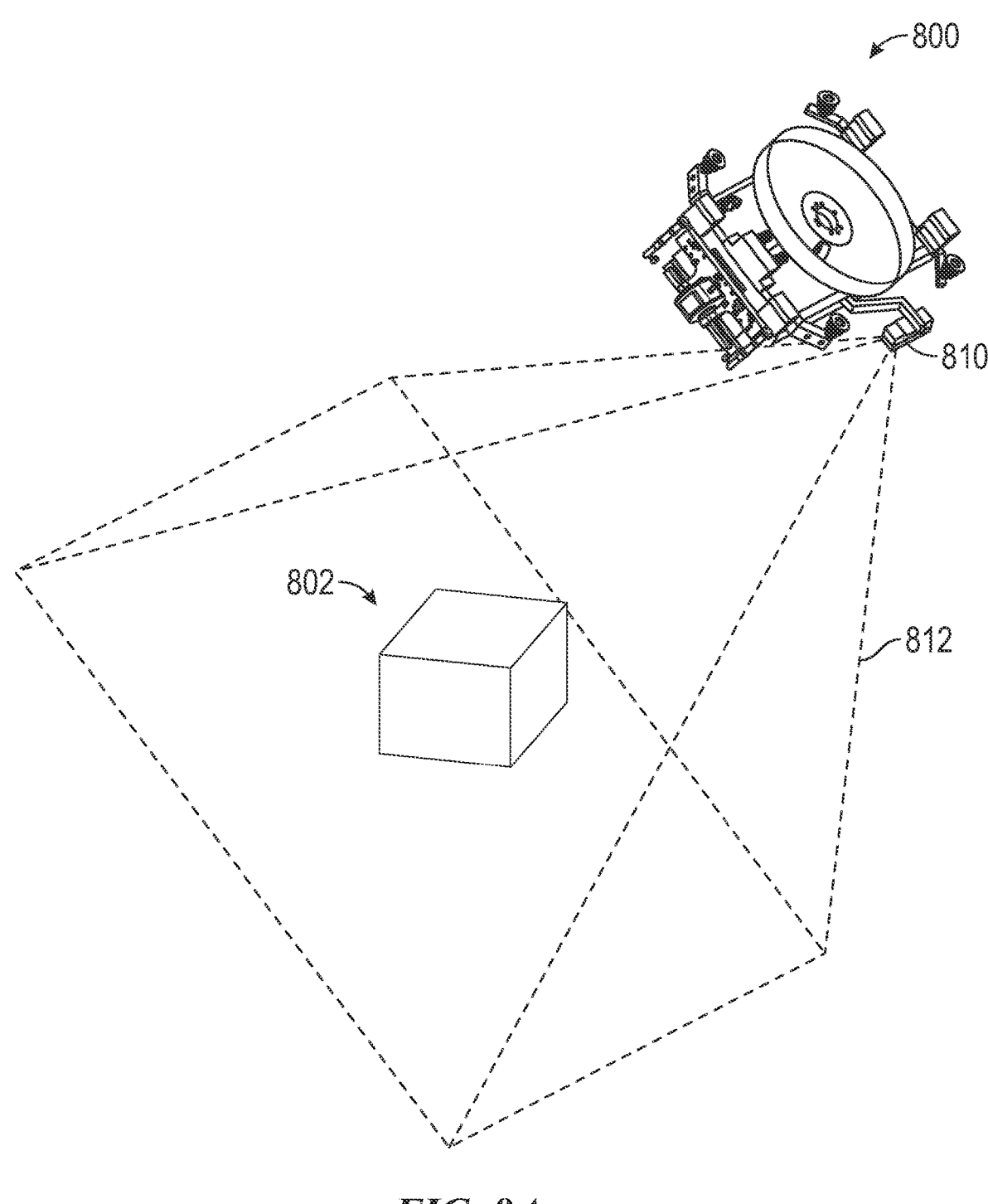
FIGS. 8A-8C are partially schematic illustrations of an object-gripping assembly 800 at various stages of a process for gripping a target object 802 in accordance with some embodiments of the present technology.
Figure 8B:
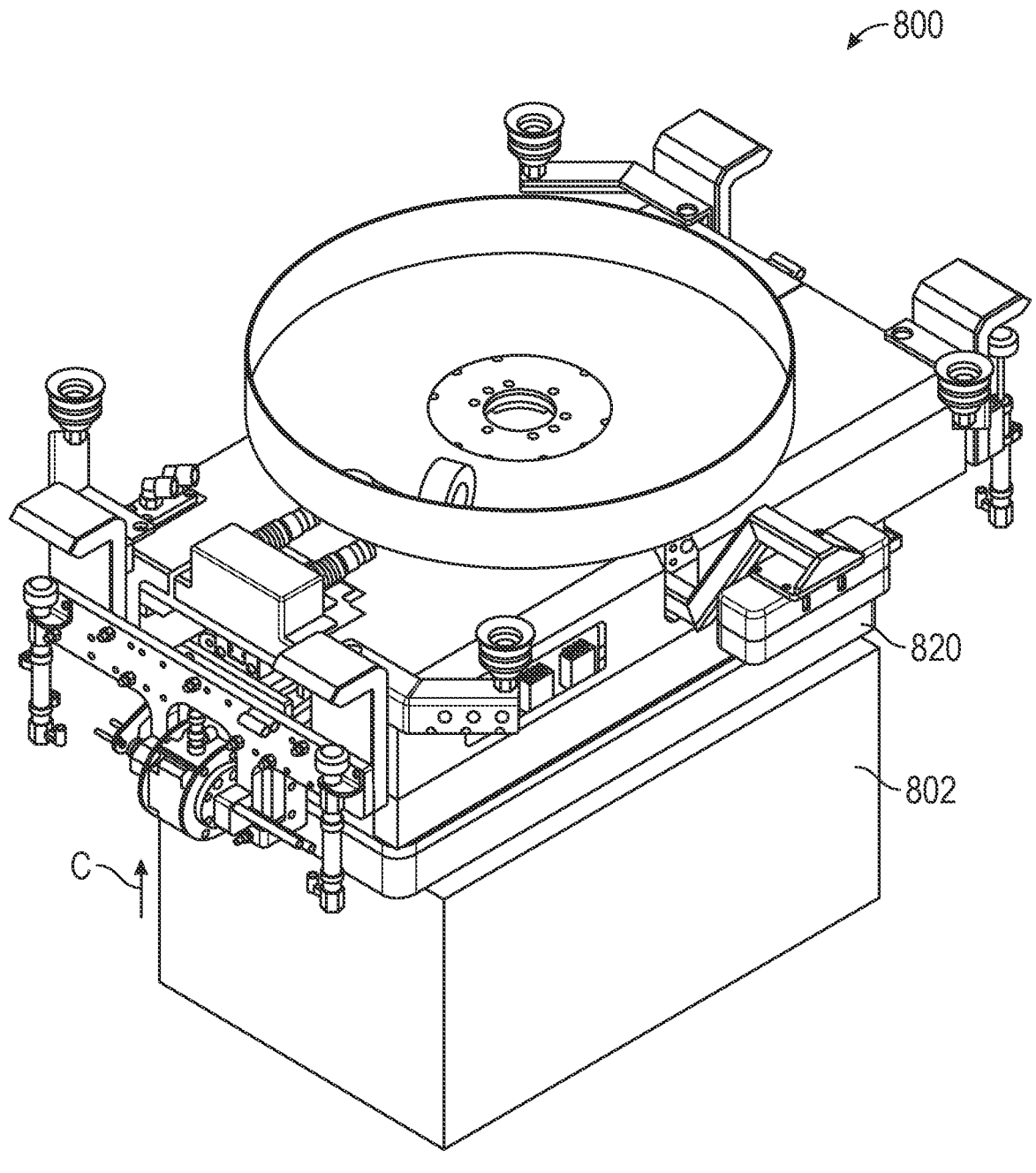
Figure 8C:
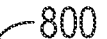
Figure 8C:
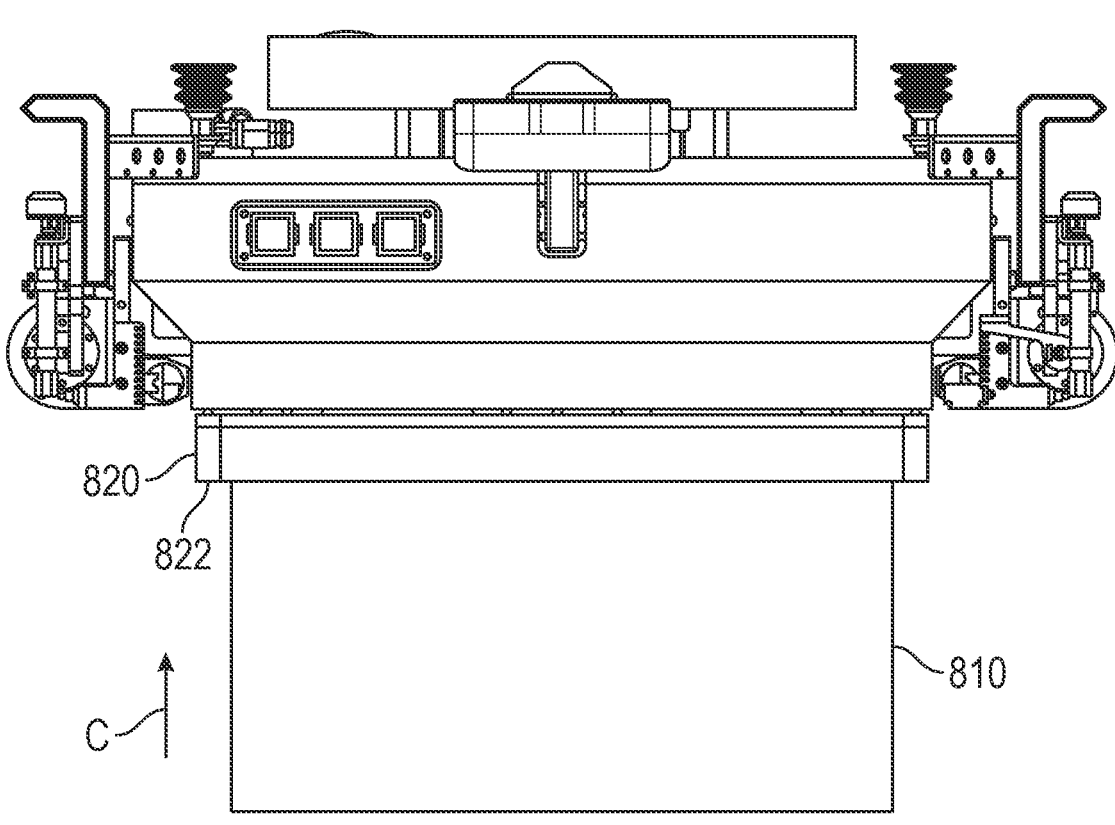

FIGS. 8A-8C are partially schematic illustrations of an object-gripping assembly 800 at various stages of a process for gripping a target object 802 in accordance with some embodiments of the present technology. A robotic arm, or other mechanism, for moving and positioning the object-gripping assembly 800 is omitted from FIGS. 8A-8C to avoid obscuring certain aspects of the invention.

FIG. 8A illustrates an object-gripping assembly 800 (and/or a controller communicatively coupled thereto) detecting the target object 802 within a field of vision 812 of an imaging component 810 (e.g., an instance of the imaging device 222 of FIG. 2). As discussed above with reference to FIG. 7, the detection can be based on various machine or computer vision algorithms, artificial intelligence and/or machine learning algorithms, and the like. Further, the detection can identify the type of target object, the orientation of the target object, various dimensions of the target object, and the like. In the illustrated embodiment, for example, the detection can identify the target object 802 as a box (e.g., containing consumer goods, various foodstuffs, and the like). As further discussed above, the object-gripping assembly 800 (and/or a controller communicatively coupled thereto) can plan a various tasks of a gripping operation to pick up, transport, and/or place the target object 802.

As illustrated in FIGS. 8B and 8C, the gripping operation can implement one or more tasks to engage a surface (e.g., an upper surface) of the target object 802 with a lower surface 822 of a vacuum-operated component 820 of the object-gripping assembly 800. Once engaged, the vacuum-operated component 820 can be actioned to supply a vacuum force to the target object 802, then the object-gripping assembly 800 can be lifted along movement paths C. As a result of the motion and vacuum force, the object-gripping assembly 800 lifts the target object 802.

In the illustrated embodiments, the gripping operation is performed with the object-gripping assembly 800 in the fully folded state. This configuration allows the lower surface 822 of the vacuum-operated component 820 to define a lowermost surface of the object-gripping assembly 800. As a result, the lower surface 822 is able to engage the target object 802 without any risk of obstructions from other components of the object-gripping assembly 800. In some embodiments, however, the object-gripping assembly 800 can be in an extended state (e.g., FIG. 6B) and/or a clamping state (e.g., FIG. 6C), provided that the lower surface 822 is able to engage the target object 802.

Figure 9A:
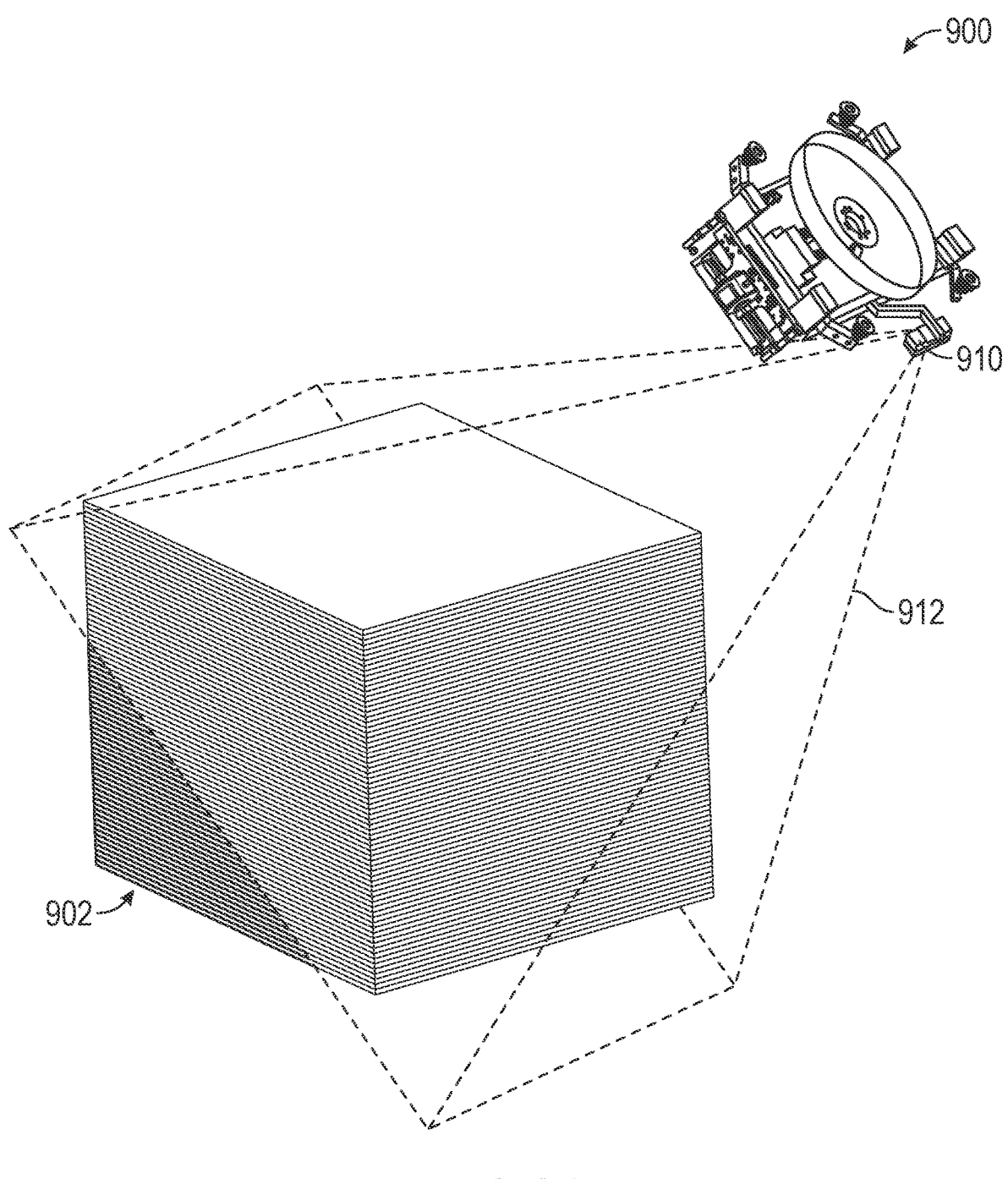
FIGS. 9A-9C are partially schematic illustrations of an object-gripping assembly 900 at various stages of a process for gripping a target object 902 in accordance with some embodiments of the present technology.
Figure 9B:
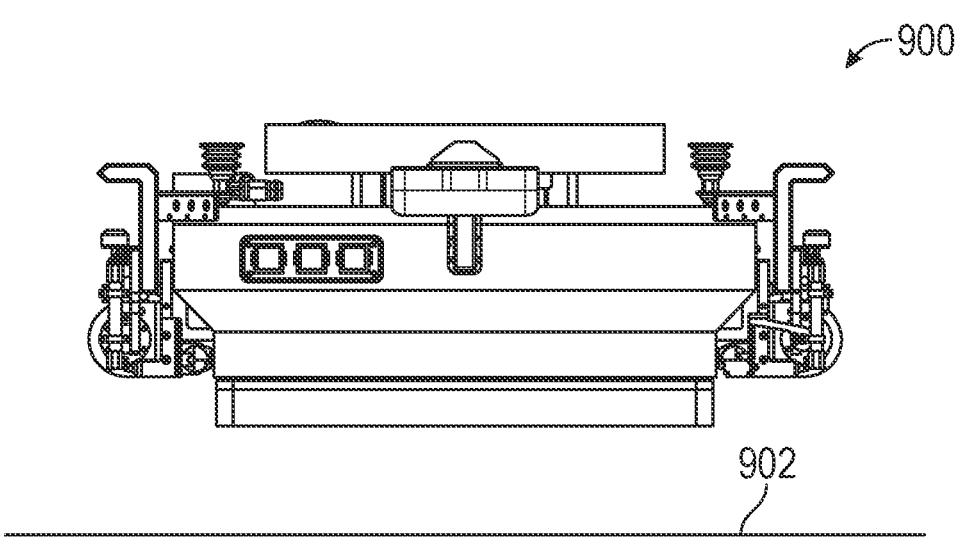
Figure 9C:
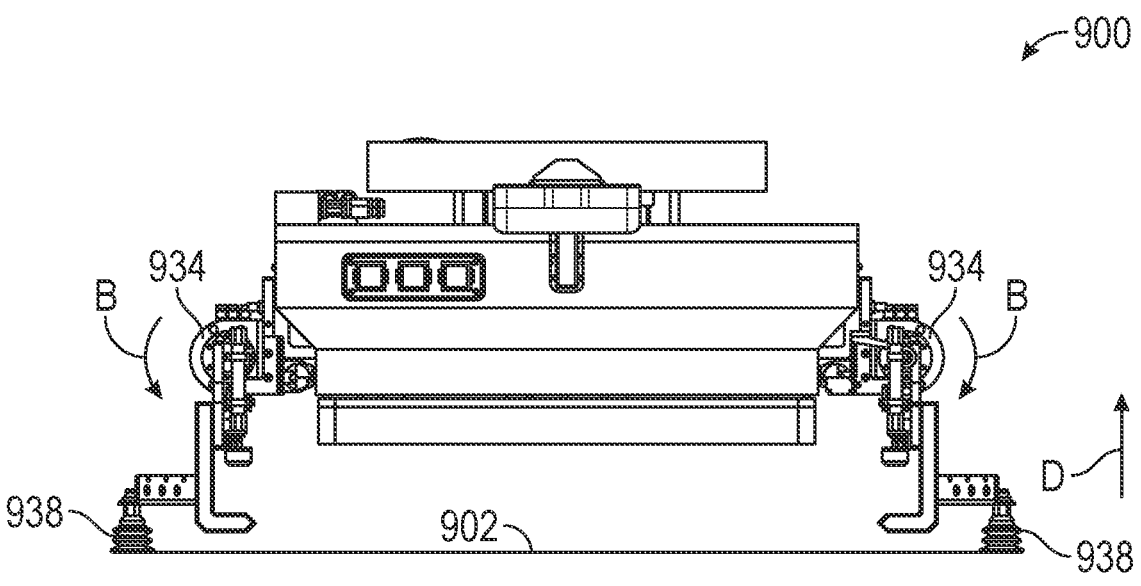

FIGS. 9A-9C are partially schematic illustrations of an object-gripping assembly 900 at various stages of a process for gripping a target object 902 in accordance with some embodiments of the present technology. A robotic arm, or other mechanism, for moving and positioning the object-gripping assembly 900 is omitted from FIGS. 9A-9C to avoid obscuring certain aspects of the invention.

Similar to the illustration in FIG. 8A, FIG. 9A illustrates an object-gripping assembly 900 (and/or a controller communicatively coupled thereto) detecting the target object 902 within a field of vision 912 of an imaging component 910. As discussed above, the detection can be based on various machine or computer vision algorithms, artificial intelligence and/or machine learning algorithms, and the like. Further, the detection can identify the type of target object, the orientation of the target object, various dimensions of the target object, and the like. In the illustrated embodiment, for example, the detection can identify the target object 902 as a stack of one or more slips that can be placed between levels of a large-scale shipping component to reduce the risk of damage between the objects in each layer. As further discussed above, the object-gripping assembly 900 (and/or a controller communicatively coupled thereto) can plan various tasks for a gripping operation to pick up, transport, and/or place the target object 902.

FIGS. 9B and 9C illustrate the object-gripping assembly 900 transitioning from the fully folded state (FIG. 9B) to a clamping state (FIG. 9C) that is suitable for the target object 902. In the illustrated embodiment, the transition includes actioning rotational components 934 along the rotational paths B from a raised position to a lowered position. As illustrated in FIG. 9C, in the lowered position, the rotational components 934 can direct one or more suction components 938 (two shown) downward to engage the target object 902. The suction components 938 can then apply a suction force to the target object 902, allowing the object-gripping assembly 900 to lift the target object 902 along movement paths D.

In some embodiments, the transition from the fully folded state (FIG. 9B) to a clamping state (FIG. 9C) can include expanding the object-gripping assembly 900, thereby increasing a distance between the suction components 938. The expansion can allow the object-gripping assembly 900 to be adjusted to pick up objects with larger footprints using the suction components 938.

FIGS. 10A-10E partially schematic illustrations of an object-gripping assembly 1000 at various stages of a process for gripping a target object 1002 in accordance with some embodiments of the present technology. A robotic arm, or other mechanism, for moving and positioning the object-gripping assembly 1000 is omitted from FIGS. 10A-10E to avoid obscuring certain aspects of the invention.

Figure 10A:
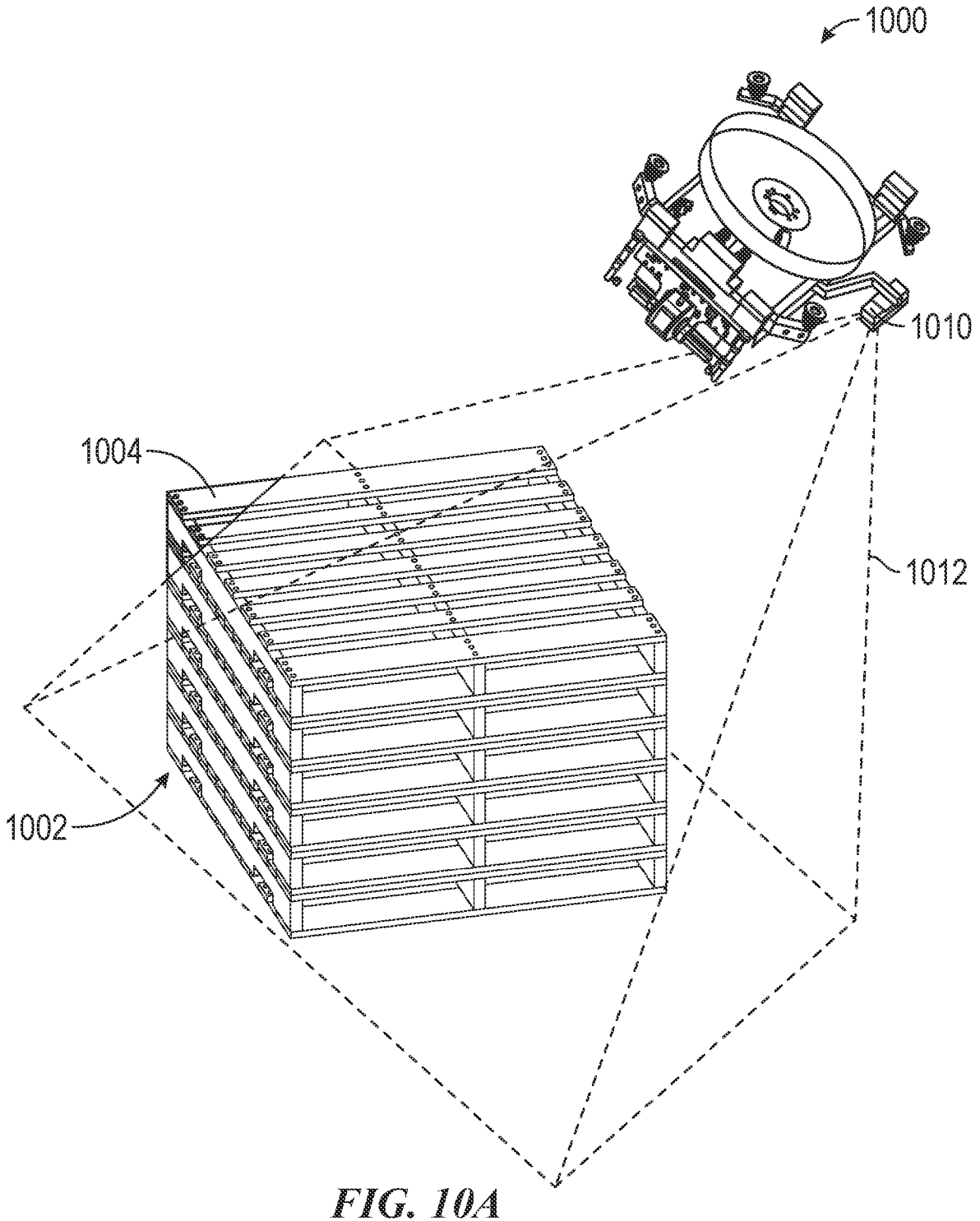
FIGS. 10A-10E partially schematic illustrations of an object-gripping assembly 1000 at various stages of a process for gripping a target object 1002 in accordance with some embodiments of the present technology.

FIG. 10A illustrates an object-gripping assembly 1000 (and/or a controller communicatively coupled thereto) detecting the target object 1002 within a field of vision 1012 of an imaging component 1010. As discussed above, the detection can be based on various machine or computer vision algorithms, artificial intelligence and/or machine learning algorithms, and the like. Further, the detection can identify the type of target object, the orientation of the target object, various dimensions of the target object, and the like. In the illustrated embodiment, for example, the detection can identify the target object 1002 as a stack of one or more pallets that can each be placed at the bottom of a large-scale shipping component (e.g., a pallet of consumer goods) to provide structural support to each unit. The object-gripping assembly 1000 (and/or a controller communicatively coupled thereto) can then plan various tasks for a gripping operation to pick up, transport, and/or place the target object 1002 based on pallet-specific dimensions and orientations. For example, an uppermost pallet 1004 in the stack of one or more pallets can have a width that varies from a standard pallet (e.g., due to a missing plank of wood, common variances in pallet size, and the like), thereby requiring the object-gripping assembly 1000 (and/or a controller communicatively coupled thereto) to plan a specific task for the uppermost pallet 1004.

Figure 10B:
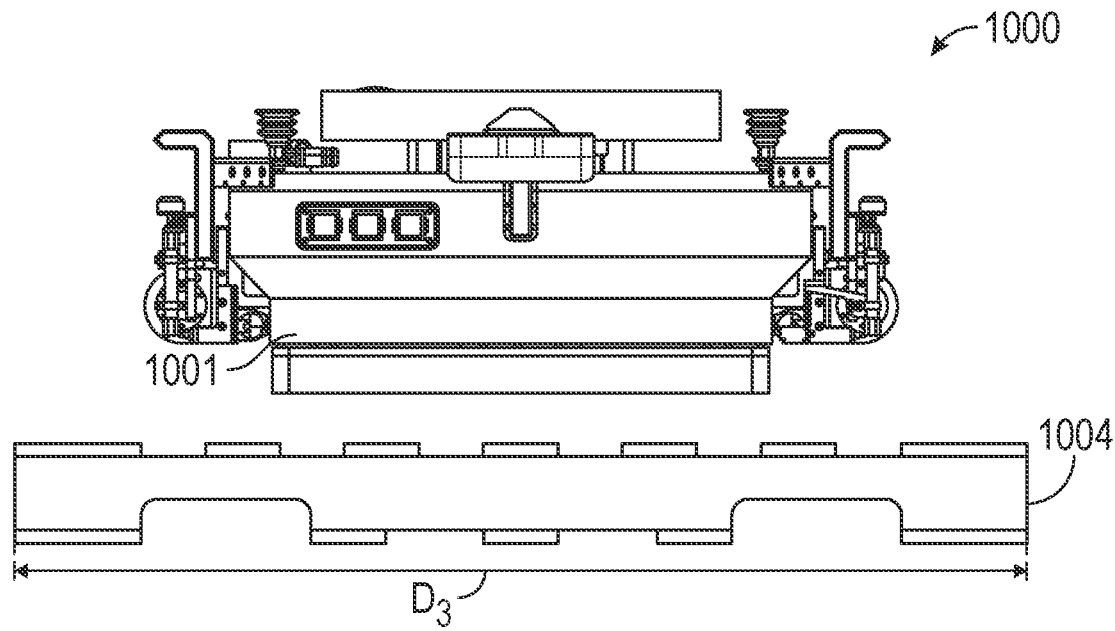

FIGS. 10B-10E illustrate the object-gripping assembly 1000 transitioning from the fully folded state (FIG. 10B) to a clamping state (FIG. 10E) that is suitable for the uppermost pallet 1004. As illustrated in FIG. 10B, the uppermost pallet 1004 has a width of a third distance D3. The transition process can begin with positioning a main body 1001 of the object-gripping assembly 1000 within a longitudinal footprint of the pallet defined by the width.

Figure 10C:
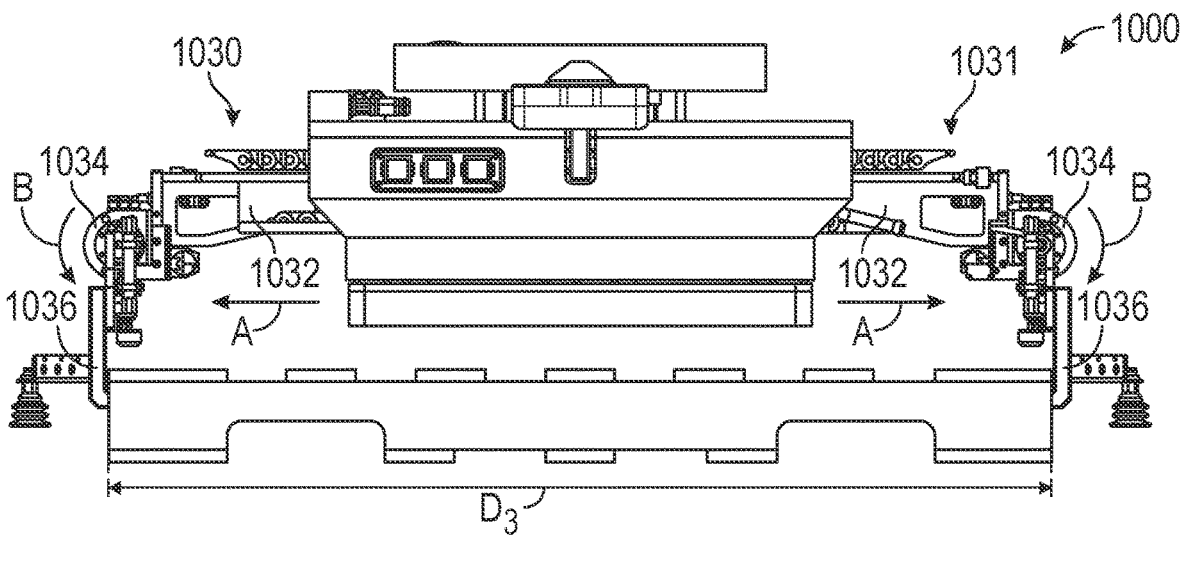

As illustrated in FIG. 10C, the transition process can continue by expanding a linear mechanism 1031 by moving legs 1032 along linear paths A such that opposing rotational components 1034 are spaced the third distance D3 apart from each other and actioning the rotational components 1034 along the rotational paths B from a raised position to a lowered position. As a result, two or more mechanical gripping components 1036 (two shown in FIG. 10C on opposing sides) can engage the uppermost pallet 1004. In some embodiments, the transition process completes in the arrangement illustrated in FIG. 10C and the uppermost pallet 1004 can be lifted by the object-gripping assembly 1000. However, in some embodiments, the transition process includes additional steps to further improve the stability of the grasp of the object-gripping assembly 1000 on the uppermost pallet 1004.

Figure 10D:
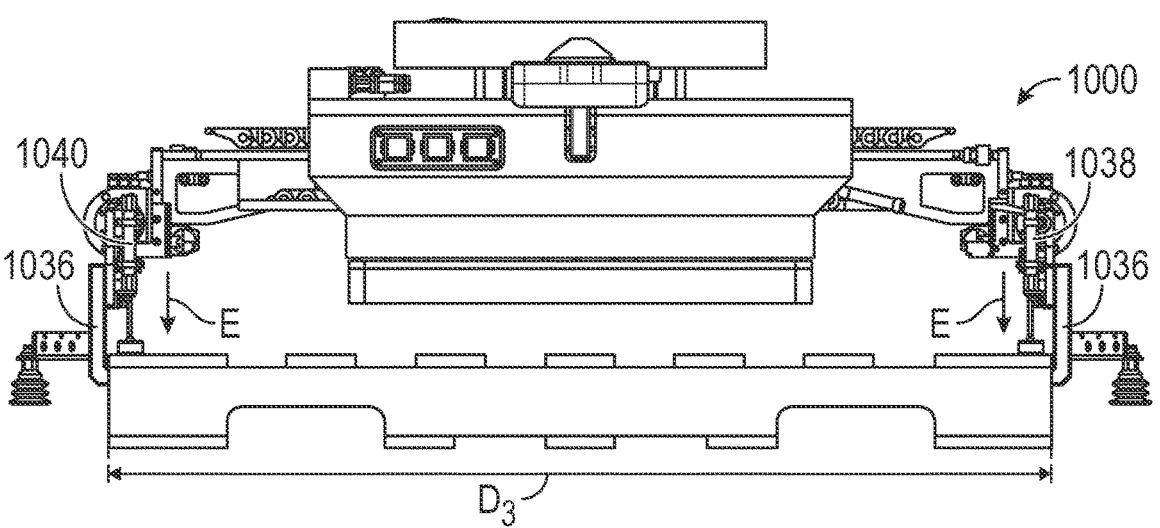

For example, as illustrated in FIG. 10D, the transition process can include actioning one or more press cylinders 1040 (two shown in FIG. 10D on opposing sides) along vertical paths E. The press cylinders 1040 further engage the uppermost pallet 1004 by pressing the uppermost pallet 1004 against the mechanical gripping components 1036. As a result, the press cylinders 1040 can help stabilize the uppermost pallet 1004 during various tasks of the gripping operation (e.g., by reducing the ability of the uppermost pallet 1004 to shift on the mechanical gripping components 1036).

Figure 10E:
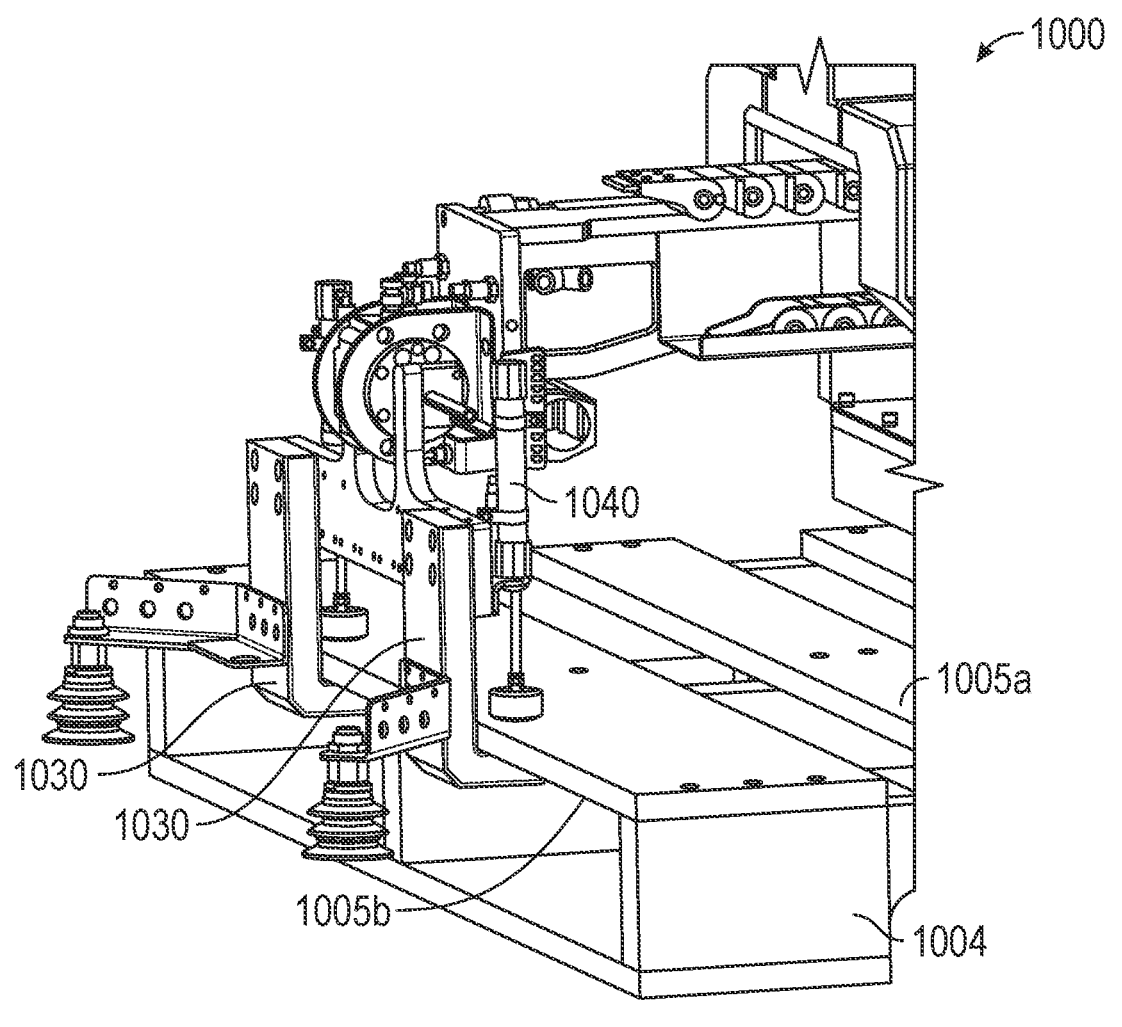

FIG. 10E is a detailed view of the object-gripping assembly 1000 fully transitioned into the clamping state. As illustrated in FIG. 10E, the press cylinders 1040 can push downwards on an upper surface 1005*a* of the uppermost pallet 1004 while the mechanical gripping components 1036 engage a lower surface 1005*b*. The opposing forces can secure the uppermost pallet 1004 during various tasks of the gripping operation, thereby preventing the uppermost pallet 1004 from sliding, rocking, and/or otherwise moving off the mechanical gripping components 1036.

Figure 11:
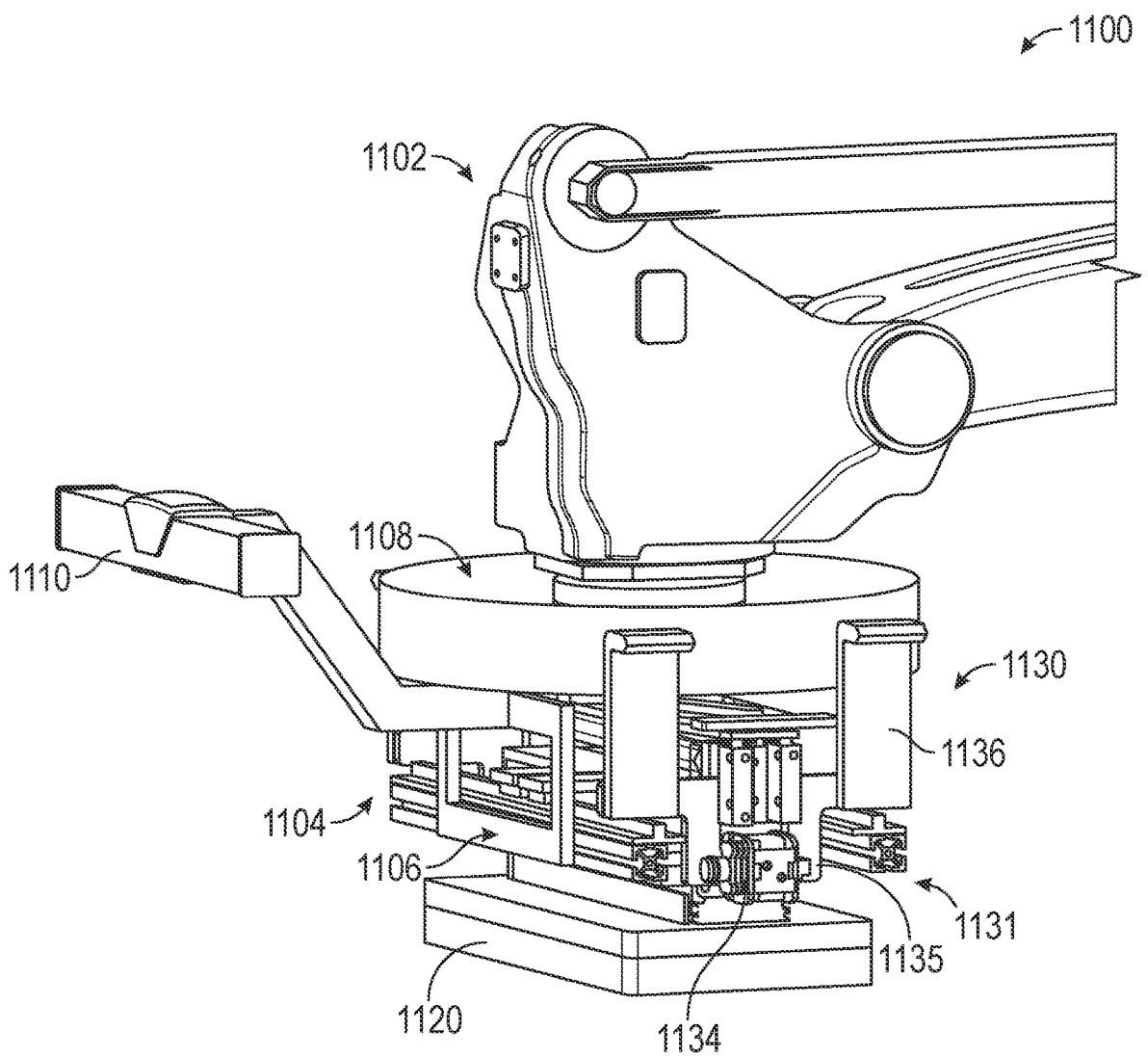
FIG. 11 is an illustration of an object-gripping system 1100 in accordance with further embodiments of the present technology.

FIG. 11 is an illustration of an object-gripping system 1100 in accordance with further embodiments of the present technology. In the illustrated embodiment, the object-gripping system 1100 includes a robotic arm 1102 and an object-gripping assembly 1104 coupled to the robotic arm 1102 through an external connector 1108 of the object-gripping assembly 1104. As further illustrated in FIG. 11, the object-gripping assembly 1104 is generally similar to the object gripping assemblies discussed above.

For example, the object-gripping assembly 1104 includes a main body 1106, as well as an imaging component 1110 and a vacuum-operated gripping component 1120 each coupled to the main body 1106. Further, the object-gripping assembly 1104 includes a variable-width gripping component 1130 coupled to the main body 1106. The variable-width gripping component 1130 includes a linear expansion component 1130 coupled to the main body 1106 and configured to expand a longitudinal footprint of the object-gripping assembly 1104. The variable-width gripping component 1130 also includes a rotational component 1134 coupled to each side of the linear expansion component 1131, a support plate 1135 coupled to each of the rotational components 1134, and one or more mechanical gripping components 1136 (two shown) coupled to each of the support plates 1135.

However, in the illustrated embodiment, the linear expansion component 1131 includes an extendable track coupled to the main body 1106 to increase and/or decrease the distance between opposing rotational components 1134. Additionally, the variable-width gripping component 1130 omits the suction components. The omission can decrease the longitudinal footprint of the object-gripping assembly 1104 in the fully folded state and/or decrease the vertical footprint of the object-gripping assembly 1104 in the clamping state. Both reductions can allow the object-gripping assembly 1104 to operate in tighter spaces.

EXAMPLES

The present technology is illustrated, for example, according to various aspects described below. Various examples of aspects of the present technology are described as numbered examples (1, 2, 3, etc.) for convenience. These are provided as examples and do not limit the present technology. It is noted that any of the dependent examples can be combined in any suitable manner, and placed into a respective independent example. The other examples can be presented in a similar manner.

1. An example object-gripping assembly, including:
   a main body having an upper surface and a lower surface opposite the upper surface;
   a vacuum operated gripping component coupled to the lower surface, the vacuum operated gripping component configured to engage a first target object of a first category; and
   a variable-width gripping component coupled to the main body, the variable-width gripping component including:
      a first arm coupled to the main body and having a first end region at a first longitudinal side of the main body;
      a first mechanical gripping component coupled to the first end region of the first arm, the first mechanical gripping component including one or more first clamps configured to engage a first side of a second target object of a second category, wherein the second target object is categorically different from the first target object;
      a first rotational component coupling the first mechanical gripping component to the first arm, the first rotational component movable between a raised position and a lowered position;
      a second arm coupled to the main body and having a second end region at a second longitudinal side of the main body opposite the first longitudinal side;
      a second mechanical gripping component coupled to the second end region of the second arm, the second mechanical gripping component including one or more second clamps configured to engage a second side of the second target object; and
      a second rotational component coupling the second mechanical gripping component to the second arm, the second rotational component movable between the raised position and the lowered position,
      wherein the first arm and the second arm are extendable in a linear direction to control a distance between the first end region and the second end region.

2. The assembly of example 1 or a portion thereof wherein the second category of the second target object includes a pallet, and wherein the variable-width gripping component further includes:
   one or more first suction components coupled to the first mechanical gripping component, wherein the one or more first suction components are configured to engage an upper surface of a third target object of a third category different from the first category and the second category, the third category including a slip sheet; and
   one or more second suction components coupled to the second mechanical gripping component, wherein the one or more second suction components are configured to engage the upper surface of the second target object,
   wherein the first category of the first target object includes one or more packages targeted for placement on the pallet and/or the slip sheet.

3. The assembly of any one of examples 1-2 or any portions thereof wherein:
   the first mechanical gripping component further includes a first support plate coupled between the one or more first clamps and the first rotational component; and the second mechanical gripping component further includes a second support plate coupled between the one or more second clamps and the second rotational component.

4. The assembly of any one of examples 1-3 or any portions thereof wherein, when the first rotational component and the second rotational component are in the lowered position, the one or more first clamps and the one or more second clamps are positioned to engage a lower surface of the second target object on the first and second sides, and wherein:

The first mechanical gripping component further includes one or more first press cylinders coupled to the first support plate and positioned to apply a pressing force to an upper surface of the second target object on the first side; and the second mechanical gripping component further includes one or more second press cylinders coupled to the second support plate and positioned to apply the pressing force to the upper surface of the second target object on the second side.

5. The assembly of any one of examples 1~4 or any portions thereof, further comprising an imaging sensor coupled to the main body and positioned to collect image data of an object within a proximity of the object-gripping assembly wherein the imaging sensor is operatively couplable to a controller to send the image data to the controller for a determination of a category of the object and whether to grip the object with the vacuum operated gripping component or the variable-width gripping component.

6. The assembly of any one of examples 1-5 or any portions thereof wherein the vacuum operated gripping component includes a foam suction gripper configured to engage a second target object different from the first target object.

7. The assembly of any one of examples 1-6 or any portions thereof, further comprising an external connector coupled to the upper surface of the main body and operatively couplable to a robotic arm, wherein the variable-width gripping component is positioned to expand along a first axis, and wherein the external connector is positioned to control a rotation of the main body about a second axis orthogonal to the first axis.

8. The assembly of any one of examples 1-7 or any portions thereof wherein the first rotational component and the second rotational component move 180 degrees between the raised position and the lowered position.

9. An example method comprising:

generating commands for positioning, with a robotic arm, the object-gripping assembly adjacent a target object;

generating commands to dynamically configure the object-gripping assembly into a gripping state, the gripping state including at least one of a fully folded state, a plurality of extended states, and a clamping state, generating commands to engage the target object once the object-gripping assembly is in the gripping state;

generating commands for moving, with the robotic arm, the target object from a first position to a second position spaced apart from the first position; and generating commands to disengage the target object at the second position.

10. The method of example 9, wherein:

the object-gripping assembly includes:

a main body;

a vacuum operated gripping component coupled to a lower surface of the main body; and a variable-width gripping component coupled to the main body and including two or more mechanical gripping elements;

in the fully folded state, the variable-width gripping component is fully retracted and the vacuum operated gripping component is positioned to define a lowermost surface of the object-gripping assembly to engage the target object;

each of the plurality of extended states change a distance between the two or more mechanical gripping elements of the variable-width gripping component; and in the clamping state, the two or more mechanical gripping elements are positioned to engage the target object.

11. The method of any one of examples 9-10 or any portions thereof, further comprising: receiving image data of the target object; and determining one or more characteristics of the target object from the image data, the one or more characteristics including at least one of: a category of the target object, an orientation of the target object, and candidate gripping locations on the target object, wherein the commands to dynamically configure the object-gripping assembly into the gripping state are based at least in part on the one or more characteristics of the target object determined from the image data.

12. The method of any one of examples 9-11 or any portions thereof, further comprising: identifying an angle of the image data with respect to a vertical axis; and accounting the identified angle in the image data using one or more distortions to the image data.

13. The method of any one of examples 9-12 or any portions thereof, further comprising:

identifying an angle of the image data with respect to a face of the target object; and accounting the identified angle in the image data using one or more distortions to the image data.

14. The method of any one of examples 9-13 or any portions thereof, further comprising:

identifying a first angle of the image data with respect to a face of the target object; and generating instructions to generate new image data of the target object at a second angle that is orthogonal with respect to the face of the target object.

15. The method of any one of examples 9-14 or any portions thereof wherein the target object is a first target object and the gripping state is a first gripping state, and wherein the method further comprises:

generating commands for positioning, with the robotic arm, the object-gripping assembly adjacent a second target object;

generating commands to dynamically configure the object-gripping assembly into a second gripping state, the second gripping state including at least one of the fully folded state, the plurality of extended states, and the clamping state;

generating commands to engage the second target object once the object-gripping assembly is in the second gripping state;

generating commands for moving, with the robotic arm, the second target object from a third position to a fourth position spaced apart from the third position; and generating commands to disengage the second target object at the fourth position.

16. The method of any one of examples 9-15 or any portions thereof, wherein the target object is one of a plurality of different target objects, wherein the plurality of different target objects includes one or more packages, one or more pallets, and one or more slip sheets, and wherein the method further comprises:

identifying an operation for manipulating the plurality of different target objects that includes a sequence of tasks corresponding to manipulating the plurality of different target objects, wherein of operation a packing operation or an unpacking operation; and based on the identified operation and the sequence of tasks, iteratively selecting each object in the plurality of different target objects as the target object and generating corresponding commands for positioning, dynamically configuring, engaging, moving and disengaging the selected target object.

17. An example robotic system, comprising:

a robotic arm; and an object-gripping assembly coupled to the robotic arm, the object-gripping assembly including:

a main body having an upper surface and a lower surface opposite the upper surface;

an external connector coupled between the upper surface of the main body and the robotic arm;

a vacuum operated gripping component coupled to the lower surface of the main body; and a variable-width gripping component coupled to the main body, the variable-width gripping component movable between a fully folded state, a plurality of extended states, and a clamping state.

18. The robotic system of example 17 wherein the variable-width gripping component includes:

a linear extension mechanism coupled to the main body, the linear extension mechanism having a first distal region and a second distal region opposite the first distal region;

two rotational mechanisms individually coupled to the first and second distal regions of the linear extension mechanism; and one or more mechanical grippers coupled to each of the rotational mechanisms.

19. The robotic system of any one of examples 17-18 or any portions thereof wherein, in the fully folded state:

the linear extension mechanism is retracted to position the first and second distal regions of the linear extension mechanism at a minimum distance apart; and the rotational mechanisms are in a raised position, wherein the raised position of the rotational mechanisms directs the one or more mechanical grippers coupled to each of the rotational mechanisms away from the lower surface of the main body.

20. The robotic system of any one of examples 17-18 or any portions thereof wherein:

the object-gripping assembly further includes an imaging sensor coupled to the main body and positioned to collect image data of an object the object-gripping assembly gripping the object through the vacuum operated gripping component and/or the variable-width gripping component; and the robotic system further comprises a controller operatively coupled to the imaging sensor, the vacuum operated gripping component, and the variable-width gripping component to:

receive the image data from the imaging sensor;

determine which of the fully folded state and the plurality of extended states to use to grip the object, the determination based on at least one of: a category of the object, an orientation of the object, and candidate gripping locations on the object;

move the variable-width gripping component into the determined state; and control the vacuum operated gripping component and/or the variable-width gripping component to grip the object.

21. An example end-effector assembly, including:

a main body;

a first gripping component coupled to or on the main body, the gripping component configured to engage a first category of objects; and a second gripping component coupled to the main body, the second gripping component configured to engage a second category of objects.

22. The assembly of example 21, further comprising a third gripping component coupled to the main body and/or the second gripping component, the third gripping component configured to engage a third category of object.

23. A system including a robotic arm operably coupled to the assembly of any one of examples 21-22 or any portions thereof.

24. A system including a controller communicatively coupled to the assembly and/or the system of any one of examples 21-23 or any portions thereof, wherein the controller is configured to implement a method of operating the assembly and/or the system to adjust a configuration of the assembly to selectively grip and/or transfer an object belonging to one of the first, second, or third object categories (e.g., any one or more or portions of examples 9-16).

CONCLUSION

From the foregoing, it will be appreciated that specific embodiments of the technology have been described herein for purposes of illustration, but well-known structures and functions have not been shown or described in detail to avoid unnecessarily obscuring the description of the embodiments of the technology. To the extent any material incorporated herein by reference conflicts with the present disclosure, the present disclosure controls. Where the context permits, singular or plural terms may also include the plural or singular term, respectively. Moreover, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Furthermore, as used herein, the phrase "and/or" as in "A and/or B" refers to A alone, B alone, and both A and B. Additionally, the terms "comprising," "including," "having," and "with" are used throughout to mean including at least the recited feature(s) such that any greater number of the same features and/or additional types of other features are not precluded.

From the foregoing, it will also be appreciated that various modifications may be made without deviating from the disclosure or the technology. For example, one of ordinary skill in the art will understand that various components of the technology can be further divided into subcomponents, or that various components and functions of the technology may be combined and integrated. In addition, certain aspects of the technology described in the context of particular embodiments may also be combined or eliminated in other embodiments. Furthermore, although advantages associated with certain embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

We claim:

1. An object-gripping assembly, comprising:
a main body having an upper surface and a lower surface opposite the upper surface;
a vacuum operated gripping component coupled to the lower surface, the vacuum operated gripping component configured to engage a first target object of a first category; and
a variable-width gripping component coupled to the main body, the variable-width gripping component including:
a first arm coupled to the main body and having a first end region at a first longitudinal side of the main body;
a first mechanical gripping component coupled to the first end region of the first arm, the first mechanical gripping component including one or more first clamps configured to engage a first side of a second target object of a second category,
wherein the second target object is categorically different from the first target object,
wherein the second category of the second target object includes a pallet;
one or more first suction components coupled to the first mechanical gripping component, wherein the one or more first suction components are configured to engage an upper surface of a third target object of a third category different from the first category and the second category, the third category including a slip sheet;
a first rotational component coupling the first mechanical gripping component to the first arm, the first rotational component movable between a raised position and a lowered position;
a second arm coupled to the main body and having a second end region at a second longitudinal side of the main body opposite the first longitudinal side;
a second mechanical gripping component coupled to the second end region of the second arm, the second mechanical gripping component including one or more second clamps configured to engage a second side of the second target object;
one or more second suction components coupled to the second mechanical gripping component, wherein the one or more second suction components are configured to engage the upper surface of the second target object; and
a second rotational component coupling the second mechanical gripping component to the second arm, the second rotational component movable between the raised position and the lowered position,
wherein the first arm and the second arm are extendable in a linear direction to control a distance between the first end region and the second end region, and
wherein the first category of the first target object includes one or more packages targeted for placement on the pallet and/or the slip sheet.

2. The object-gripping assembly of claim 1 wherein:
the first mechanical gripping component further includes a first support plate coupled between the one or more first clamps and the first rotational component; and
the second mechanical gripping component further includes a second support plate coupled between the one or more second clamps and the second rotational component.

3. The object-gripping assembly of claim 2 wherein, when the first rotational component and the second rotational component are in the lowered position, the one or more first clamps and the one or more second clamps are positioned to engage a lower surface of the second target object on the first and second sides, and wherein:
The first mechanical gripping component further includes one or more first press cylinders coupled to the first support plate and positioned to apply a pressing force to an upper surface of the second target object on the first side; and
the second mechanical gripping component further includes one or more second press cylinders coupled to the second support plate and positioned to apply the pressing force to the upper surface of the second target object on the second side.

4. The object-gripping assembly of claim 1, further comprising an imaging sensor coupled to the main body and positioned to collect image data of an object within a proximity of the object-gripping assembly wherein the imaging sensor is operatively couplable to a controller to send the image data to the controller for a determination of a category of the object and whether to grip the object with the vacuum operated gripping component or the variable-width gripping component.

5. The object-gripping assembly of claim 1 wherein the vacuum operated gripping component includes a suction gripper configured to engage a second target object different from the first target object.

6. The object-gripping assembly of claim 1, further comprising an external connector coupled to the upper surface of the main body and operatively couplable to a robotic arm, wherein the variable-width gripping component is positioned to expand along a first axis, and wherein the external connector is positioned to control a rotation of the main body about a second axis orthogonal to the first axis.

7. The object-gripping assembly of claim 1 wherein the first rotational component and the second rotational component move 180 degrees between the raised position and the lowered position.

8. A method of operating a robotic system with an object-gripping assembly, the method comprising:
generating commands for positioning, with a robotic arm, the object-gripping assembly adjacent a target object;
generating commands to dynamically configure the object-gripping assembly into a gripping state that is selected from a fully folded state, a plurality of extended states, and a clamping state, wherein selected gripping state correspond to a selection for grasping (1) one or more packages using a vacuum operated gripping component of the object-gripping assembly, (2) a pallet using one or more clamps and one or more first suction components of the object-gripping assembly, or (3) a slip sheet using one or more second suction components;
generating commands to engage the target object once the object-gripping assembly is in the gripping state, wherein generating the commands to engage the target object includes selecting, according to the target object, one of:
controlling the vacuum operated gripping component to engage an upper surface of the target object when the target object includes a package,
controlling (i) the one or more clamps to engage corresponding one or more peripheral portions of the target object and (ii) the one or more first suction components to engage an upper surface of the target object when the target object includes the pallet, and controlling the one or more second suction components to engage an upper surface of the target object when the target object includes the slip sheet;

generating commands for moving, with the robotic arm, the target object from a first position to a second position spaced apart from the first position; and generating commands to disengage the target object at the second position, wherein generating the commands to disengage includes selecting one of:

controlling the object-gripping assembly to place the pallet at a location, controlling the one or more second suction components to place the slip sheet at the location, and controlling the vacuum operated gripping component to place the package over the pallet, the slip sheet, or both.

9. The method of claim 8, wherein:

the object-gripping assembly includes:

a main body;

a vacuum operated gripping component coupled to a lower surface of the main body; and a variable-width gripping component coupled to the main body and including two or more mechanical gripping elements;

in the fully folded state, the variable-width gripping component is fully retracted and the vacuum operated gripping component is positioned to define a lowermost surface of the object-gripping assembly to engage the target object;

each of the plurality of extended states change a distance between the two or more mechanical gripping elements of the variable-width gripping component; and in the clamping state, the two or more mechanical gripping elements are positioned to engage the target object.

10. The method of claim 8, further comprising:

receiving image data of the target object; and determining one or more characteristics of the target object from the image data, the one or more characteristics including at least one of: a category of the target object, an orientation of the target object, and candidate gripping locations on the target object, wherein the commands to dynamically configure the object-gripping assembly into the gripping state are based at least in part on the one or more characteristics of the target object determined from the image data.

11. The method of claim 10, further comprising:

identifying an angle of the image data with respect to a vertical axis; and accounting the identified angle in the image data using one or more distortions to the image data.

12. The method of claim 10, further comprising:

identifying an angle of the image data with respect to a face of the target object; and accounting the identified angle in the image data using one or more distortions to the image data.

13. The method of claim 10, further comprising:

identifying a first angle of the image data with respect to a face of the target object; and generating instructions to generate new image data of the target object at a second angle that is orthogonal with respect to the face of the target object.

14. The method of claim 8 wherein the target object is a first target object and the gripping state is a first gripping state, and wherein the method further comprises:

generating commands for positioning, with the robotic arm, the object-gripping assembly adjacent a second target object;

generating commands to dynamically configure the object-gripping assembly into a second gripping state, the second gripping state including at least one of the fully folded state, the plurality of extended states, and the clamping state;

generating commands to engage the second target object once the object-gripping assembly is in the second gripping state;

generating commands for moving, with the robotic arm, the second target object from a third position to a fourth position spaced apart from the third position; and generating commands to disengage the second target object at the fourth position.

15. The method of claim 8, wherein the target object is one of a plurality of different target objects, wherein the plurality of different target objects includes one or more packages, one or more pallets, and one or more slip sheets, and wherein the method further comprises:

identifying an operation for manipulating the plurality of different target objects that includes a sequence of tasks corresponding to manipulating the plurality of different target objects, wherein of operation a packing operation or an unpacking operation; and based on the identified operation and the sequence of tasks, iteratively selecting each object in the plurality of different target objects as the target object and generating corresponding commands for positioning, dynamically configuring, engaging, moving and disengaging the selected target object.

16. A robotic system, comprising:

a robotic arm; and an object-gripping assembly coupled to the robotic arm, the object-gripping assembly including:

a main body having an upper surface and a lower surface opposite the upper surface;

an external connector coupled between the upper surface of the main body and the robotic arm;

a variable-width gripping component coupled to the main body, the variable-width gripping component movable between a fully folded state, a plurality of extended states, and a clamping state, the variable-width gripping component including:

one or more first suction components configured to engage and grasp an upper surface of a slip sheet, and one or more second suction components, wherein the variable-width gripping component is configured to grasp a pallet and the one or more second suction components are configured to engage an upper surface of the pallet in grasping the pallet; and a vacuum operated gripping component coupled to the lower surface of the main body and configured to grasp one or more packages that are targeted for placement on the pallet and/or the slip sheet.

17. The robotic system of claim 16 wherein the variable-width gripping component includes:

a linear extension mechanism coupled to the main body, the linear extension mechanism having a first distal region and a second distal region opposite the first distal region;

two rotational mechanisms individually coupled to the first and second distal regions of the linear extension mechanism; and one or more mechanical grippers coupled to each of the rotational mechanisms.

18. The robotic system of claim 17 wherein, in the fully folded state:

the linear extension mechanism is retracted to position the first and second distal regions of the linear extension mechanism at a minimum distance apart; and the rotational mechanisms are in a raised position, wherein the raised position of the rotational mechanisms directs the one or more mechanical grippers coupled to each of the rotational mechanisms away from the lower surface of the main body.

19. The robotic system of claim 16 wherein:

the object-gripping assembly further includes an imaging sensor coupled to the main body and positioned to collect image data of an object the object-gripping assembly gripping the object through the vacuum operated gripping component and/or the variable-width gripping component; and the robotic system further comprises a controller operatively coupled to the imaging sensor, the vacuum operated gripping component, and the variable-width gripping component to:

receive the image data from the imaging sensor;

determine which of the fully folded state and the plurality of extended states to use to grip the object, the determination based on at least one of: a category of the object, an orientation of the object, and candidate gripping locations on the object;

move the variable-width gripping component into the determined state; and control the vacuum operated gripping component and/ or the variable-width gripping component to grip the object.

* * * * *